United States Patent
Harada

(10) Patent No.: US 11,448,893 B2
(45) Date of Patent: Sep. 20, 2022

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Hiroki Harada, Zushi (JP)

(73) Assignee: NIKON CORPORATION, Tokyo (JP)

( * ) Notice: Subject to any disclaimer, the term of this patent is extended or adjusted under 35 U.S.C. 154(b) by 490 days.

(21) Appl. No.: 16/317,824

(22) PCT Filed: Jul. 14, 2017

(86) PCT No.: PCT/JP2017/025769
§ 371 (c)(1),
(2) Date: Feb. 29, 2020

(87) PCT Pub. No.: WO2018/012624
PCT Pub. Date: Jan. 18, 2018

(65) Prior Publication Data
US 2020/0333621 A1 Oct. 22, 2020

(30) Foreign Application Priority Data
Jul. 15, 2016 (JP) .............................. JP2016-140098

(51) Int. Cl.
*G02B 27/64* (2006.01)
*G02B 15/14* (2006.01)
*G03B 5/00* (2021.01)

(52) U.S. Cl.
CPC .... *G02B 27/646* (2013.01); *G02B 15/144511* (2019.08); *G02B 15/145523* (2019.08);
(Continued)

(58) Field of Classification Search
CPC .......... G02B 27/646; G02B 15/145523; G02B 15/144511; G02B 15/1455; G02B 5/00; G03B 2205/007; H04N 5/23248
See application file for complete search history.

(56) References Cited

U.S. PATENT DOCUMENTS

| 5,999,329 A | 12/1999 | Ohtake |
| 2007/0223105 A1 | 9/2007 | Sensui |

(Continued)

FOREIGN PATENT DOCUMENTS

| JP | H09-179026 A | 7/1997 |
| JP | 10-048524 A | 2/1998 |

(Continued)

OTHER PUBLICATIONS

International Search Report from International Patent Application No. PCT/JP2017/025769, dated Oct. 17, 2017.
(Continued)

*Primary Examiner* — Alicia M Harrington
(74) *Attorney, Agent, or Firm* — SGPatents PLLC

(57) ABSTRACT

A zoom optical system (ZL) includes: a first lens group (G1) having negative refractive power; a second lens group (G2) having positive refractive power, the second lens group (G2) being disposed further toward an image than the first lens group (G1); and a succeeding lens group (GL) having a vibration-isolating group (GVRb) that moves so as to have a displacement component in a direction orthogonal to an optical axis, the succeeding lens group (GL) being disposed further toward the image than the second lens group (G2), a distance between the first lens group (G1) and the second lens group (G2) changing and a distance between the second lens group (G2) and the succeeding lens group (GL) changing upon zooming, and the following conditional expression being satisfied:

$$4.899 \leq |f1 \mathit{VRaw}/fw| < 1000.000$$

(Continued)

where f1VRaw is a composite focal length in a wide-angle end state of a lens disposed further toward the object than the vibration-isolating group, and fw is a focal length of the whole system in the wide-angle end state.

15 Claims, 18 Drawing Sheets

(52) U.S. Cl.
CPC ........ *G03B 5/00* (2013.01); *G03B 2205/0015* (2013.01); *G03B 2205/0046* (2013.01)

(56) References Cited

U.S. PATENT DOCUMENTS

| | | | |
|---|---|---|---|
| 2009/0002841 | A1 | 1/2009 | Yamamoto et al. |
| 2009/0231708 | A1 | 9/2009 | Shibata et al. |
| 2010/0188755 | A1 | 7/2010 | Shibata |
| 2010/0238560 | A1* | 9/2010 | Fujimoto ........ G02B 15/144511 359/682 |
| 2011/0102640 | A1 | 5/2011 | Iiyama et al. |
| 2011/0109787 | A1 | 5/2011 | Iiyama et al. |
| 2014/0022442 | A1 | 1/2014 | Nishimura |
| 2014/0085513 | A1 | 3/2014 | Tashiro et al. |
| 2015/0124322 | A1* | 5/2015 | Onozaki ............ G02B 27/646 359/557 |
| 2017/0075095 | A1* | 3/2017 | Kimura .......... G02B 15/144511 |

FOREIGN PATENT DOCUMENTS

| | | | |
|---|---|---|---|
| JP | 11-231220 | A | 8/1999 |
| JP | 2007-256695 | A | 10/2007 |
| JP | 2008-046612 | A | 2/2008 |
| JP | 2009-014761 | A | 1/2009 |
| JP | 2010-170061 | A | 8/2010 |
| JP | 2012-252253 | A | 12/2012 |
| JP | 2013-156477 | A | 8/2013 |
| JP | 2014-021258 | A | 2/2014 |
| JP | 2014-063025 | A | 4/2014 |
| JP | 2014-178388 | A | 9/2014 |
| JP | 2015-022220 | A | 2/2015 |
| WO | WO 2010/001546 | A1 | 1/2010 |
| WO | WO 2010/001547 | A1 | 1/2010 |
| WO | WO-2015146177 | A1 * | 10/2015 ..... G02B 15/144511 |

OTHER PUBLICATIONS

International Preliminary Report on Patentability from International Patent Application No. PCT/JP2017/025769, dated Jan. 24, 2019.
Office Action dated Aug. 28, 2020, in Chinese Patent Application No. 201780043792.2.
Office Action dated May 28, 2020, in Japanese Patent Application No. 2016-140098.
Office Action dated Mar. 9, 2021, in Chinese Patent Application No. 201780043792.2.
Office Action dated Mar. 23, 2021, in Japanese Patent Application No. 2016-140098.
Office Action dated Oct. 26, 2021, in Japanese Patent Application No. 2016-140098.

* cited by examiner

LATERAL
ABERRATION

LATERAL
ABERRATION

LATERAL
ABERRATION

LATERAL
ABERRATION

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus and a method for manufacturing the zoom optical system.

TECHNICAL BACKGROUND

Wide angle zoom optical systems provided with an image shake correction mechanism are conventionally proposed (e.g., see Patent literature 1). However, the zoom optical system described in Patent literature 1 has a problem that there is a demand for further improvement of optical performance.

PRIOR ARTS LIST

Patent Document

Patent literature 1: Japanese Laid-Open Patent Publication No. H11-231220(A)

SUMMARY OF THE INVENTION

A zoom optical system according to an aspect of the present invention includes a first lens group having negative refractive power, a second lens group having positive refractive power, the second lens group being disposed further toward an image than the first lens group and a succeeding lens group having a vibration-isolating group that moves so as to have a displacement component in a direction orthogonal to an optical axis, the succeeding lens group being disposed further toward the image than the second lens group, in which a distance between the first lens group and the second lens group changes and a distance between the second lens group and the succeeding lens group changes upon zooming, and the following conditional expression is satisfied:

$$4.899 \le |f1 VRaw/fw| < 1000.000$$

where, f1VRaw: a composite focal length in a wide-angle end state of a lens disposed further toward the object than the vibration-isolating group, and fw: a focal length of the whole system in the wide-angle end state.

A method for manufacturing an optical system according to an aspect of the present invention is a method for manufacturing a zoom optical system including a first lens group having negative refractive power, a second lens group having positive refractive power, the second lens group being disposed further toward an image than the first lens group and a succeeding lens group having a vibration-isolating group that moves so as to have a displacement component in a direction orthogonal to an optical axis, the succeeding lens group being disposed further toward the image than the second lens group, in which the lens groups are disposed such that a distance between the first lens group and the second lens group changes and a distance between the second lens group and the succeeding lens group changes upon zooming, and the following conditional expression is satisfied:

$$4.899 \le |f1 VRaw/fw| < 1000.000$$

where, f1VRaw: a composite focal length in a wide-angle end state of a lens disposed further toward the object than the vibration-isolating group, and fw: a focal length of the whole system in the wide-angle end state.

DESCRIPTION OF THE EMBODIMENTS

Figure 1:
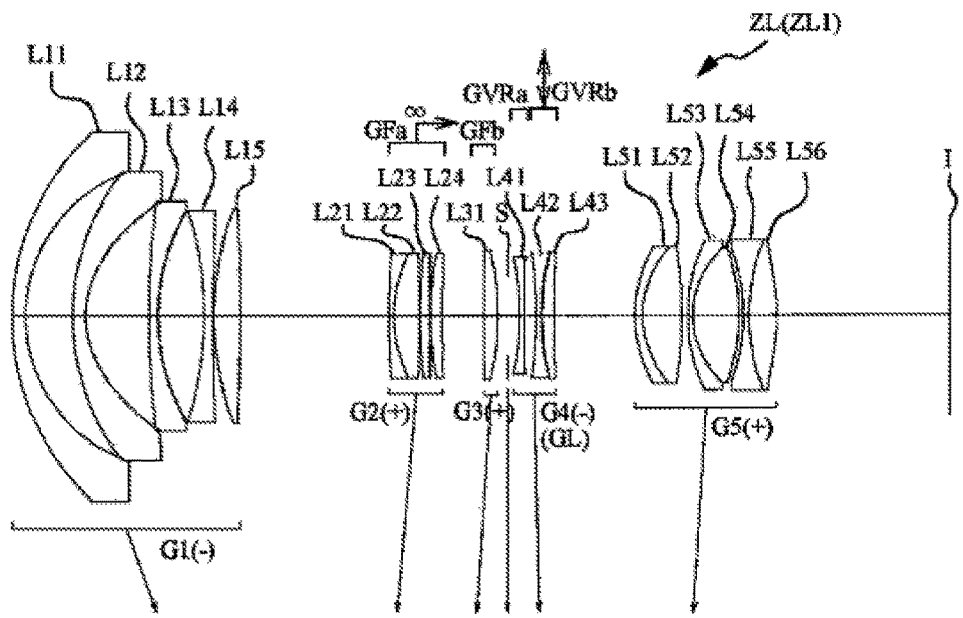
FIG. 1 is a cross-sectional drawing illustrating a lens configuration of a zoom optical system according to Example 1, where, (W) denotes a wide-angle end state, (M) denotes an intermediate focal length state and (T) denotes a telephoto end state.
Figure 1:
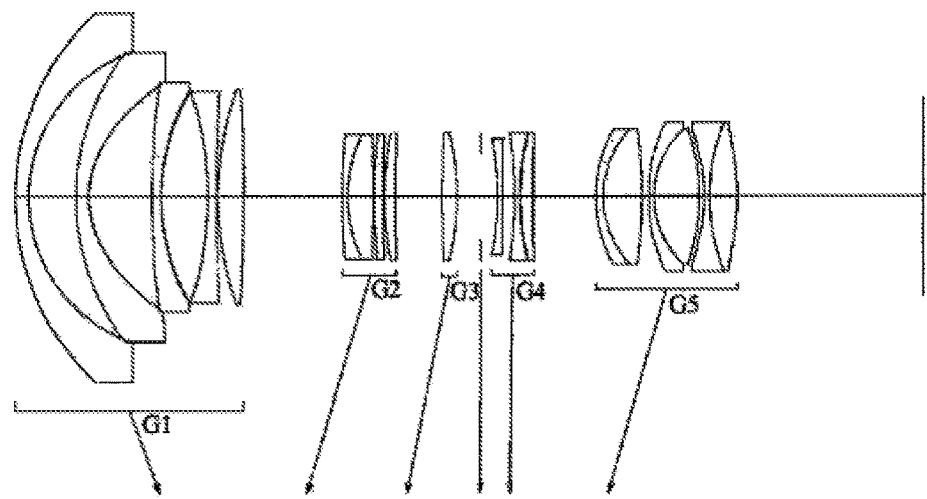
Figure 1:
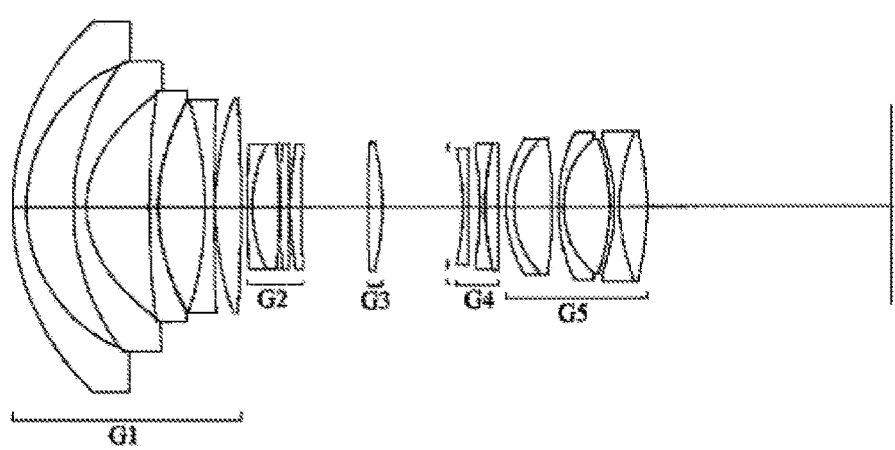

Hereinafter, preferable embodiments will be described with reference to the accompanying drawings. As shown in FIG. 1, a zoom optical system ZL according to the present embodiment is constructed of a first lens group G1 having negative refractive power, a second lens group G2 having positive refractive power, the second lens group G2 being disposed further toward an image than the first lens group G1 and a succeeding lens group GL having a vibration-isolating group GVRb for moving so as to have a displacement component in a direction orthogonal to an optical axis, the succeeding lens group GL being disposed further toward the image than the second lens group G2. This zoom optical system ZL is configured such that a distance between the first lens group G1 and the second lens group G2 changes and a distance between the second lens group G2 and the succeeding lens group GL changes upon zooming from a wide-angle end state to a telephoto end state. Such a configuration allows a wide-angle zoom optical system to be realized. The vibration-isolating group GVRb included in the succeeding lens group GL corrects image shake (vibration isolation), and can thereby prevent occurrence of decentering coma aberration upon image shake correction and occurrence of one-sided blur, and can achieve successful image forming performance.

The zoom optical system ZL according to the present embodiment preferably satisfies the following conditional expression (1).

$$4.899 \leq |f1VRaw/fw| < 1000.000 \tag{1}$$

where, f1VRaw: a composite focal length in a wide-angle end state of a lens disposed further toward the object than the vibration-isolating group GVRb, and fw: a focal length of the whole system in the wide-angle end state.

The conditional expression (1) is a condition for achieving an F value representing high brightness and successful correction of various aberrations including spherical aberration or the like. Satisfying this conditional expression (1) can bring convergent light obtained through the first lens group G1 and the second lens group G2 closer to a parallel light flux through a lens disposed further toward the object than the vibration-isolating group GVRb of the succeeding lens group GL (hereinafter, called "object-side group GVRa"), make it incident upon the vibration-isolating group GVRb, and can thereby improve vibration-isolating performance. When the zoom optical system ZL exceeds an upper limit of the conditional expression (1), refractive power (power) of the object-side group GVRa becomes too strong, aberration correction of the object-side group GVRa becomes insufficient, and it is difficult to obtain a wide field angle in a wide-angle end state, which is not preferable. Note that an upper limit of the conditional expression (1) is preferably set to 80.000 or more preferably set to 70.000 to ensure the effects of the conditional expression (1). When zoom optical system ZL falls below a lower limit of the conditional expression (1), strong convergent light is incident upon the vibration-isolating group GVRb and it becomes difficult to correct decentering coma on the telephoto end side during vibration isolation (during image shake correction) and to correct one-sided blur on the wide-angle end side, which is not preferable. The lower limit of the conditional expression (1) is preferably set to 6.000 or more preferably set to 7.000 or 8.000 to ensure the effects of this conditional expression (1).

In the zoom optical system ZL according to the present embodiment, the vibration-isolating group GVRb is preferably constructed of at least one positive lens and one negative lens. Such a configuration allows the vibration-isolating group GVRb to successfully correct spherical aberration or coma aberration and contribute to an improvement of vibration-isolating performance. The vibration-isolating group GVRb is preferably constructed of at least one positive lens and at least two negative lenses to ensure the effects of the configuration of the vibration-isolating group GVRb. When the number of negative lenses constituting the vibration-isolating group GVRb is less than one, the focal length of the vibration-isolating group GVRb decreases, more decentering coma aberration or one-sided blur may occur during vibration isolation (during image shake correction), preventing successful image forming performance from being maintained during vibration isolation (during image shake correction), which is not preferable.

In the zoom optical system ZL according to the present embodiment, four or more lenses are preferably disposed further toward the image than the first lens group G1 and disposed further toward the object than the succeeding lens group GL. Such a configuration allows the lens disposed between the first lens group G1 and the succeeding lens group GL to successfully correct spherical aberration or coma aberration and contribute to an improvement of vibration-isolating performance. To ensure the effects of this configuration, the number of lenses disposed further toward the image than the first lens group G1 and disposed further toward the object than the succeeding lens group GL is preferably five or more. Furthermore, five or more lenses having positive refractive power are preferably disposed. When the number of lens components disposed further toward the image than the first lens group G1 and disposed further toward the object than the succeeding lens group GL is three or less, the focal length of the first lens group G1 decreases and it is difficult to correct curvature of field or coma aberration, preventing successful image forming performance from being achieved.

In the zoom optical system ZL according to the present embodiment, the succeeding lens group GL includes a vibration-isolating group GVRb and an object-side group GVRa disposed on the object side of the vibration-isolating group GVRb and having negative refractive power, the succeeding lens group GL preferably satisfying the following conditional expression (2).

$$-30.00 < \beta aw < 10.00 \quad (2)$$

where,

βaw: image forming magnification of object-side group GVRa in wide-angle end state.

When the conditional expression (2) is satisfied, image surface collapse (one-sided blur) on the wide-angle end side or deterioration of optical performance such as decentering coma aberration on the telephoto end side during image blur correction by the vibration-isolating group GVRb is small, which is therefore preferable. In order to ensure the effects of this conditional expression (2), a lower limit of the conditional expression (2) may be preferably set to −25.00 or more preferably set to −15.00, −10.00 or −5.00. In order to ensure the effects of this conditional expression (2), an upper limit of the conditional expression (2) may be preferably set to 8.00, or more preferably set to 6.00 or 5.00.

The zoom optical system ZL according to the present embodiment is preferably configured such that at least part of the lens group located between the first lens group G1 and the succeeding lens group GL is the focusing group GFa and the focusing group GFa is moved in the optical axis direction upon focusing. When the zoom optical system ZL is configured in this way, it is possible to reduce the size and weight of the lens which moves upon focusing, reduce the size of the whole system of the zoom optical system ZL and increase the focusing speed at the time of auto focusing. The focusing group GFa preferably has positive refractive power. The lens located between the first lens group G1 and the succeeding lens group GL is preferably constructed of a front group GFa having positive refractive power and a rear group GFb having positive refractive power in order from the object and has the front group GFa as a focusing group.

The zoom optical system ZL according to the present embodiment preferably satisfies the following conditional expression (3).

$$0.200 < (-f1)/f2 < 0.700 \quad (3)$$

where, f1: focal length of first lens group G1 f2: focal length of second lens group G2.

The conditional expression (3) defines a ratio between a focal length of the first lens group G1 and a focal length of the second lens group G2. It is preferable to successfully correct various aberrations such as spherical aberration or coma aberration by satisfying the conditional expression (3). In order to ensure the effects of the conditional expression (3), a lower limit of the conditional expression (3) is preferably set to 0.220, or more preferably set to 0.240, 0.260, 0.300 or 0.350. In order to ensure the effects of the conditional expression (3), an upper limit of the conditional expression (3) is preferably set to 0.650, or more preferably set to 0.600, 0.550 or 0.500.

The conditions and configurations described above each exhibit the aforementioned effects, are not limited to those satisfying all the conditions and configurations, but those satisfying any of conditions or configurations, or a combination of any conditions or configurations can achieve the above effects.

Figure 17:
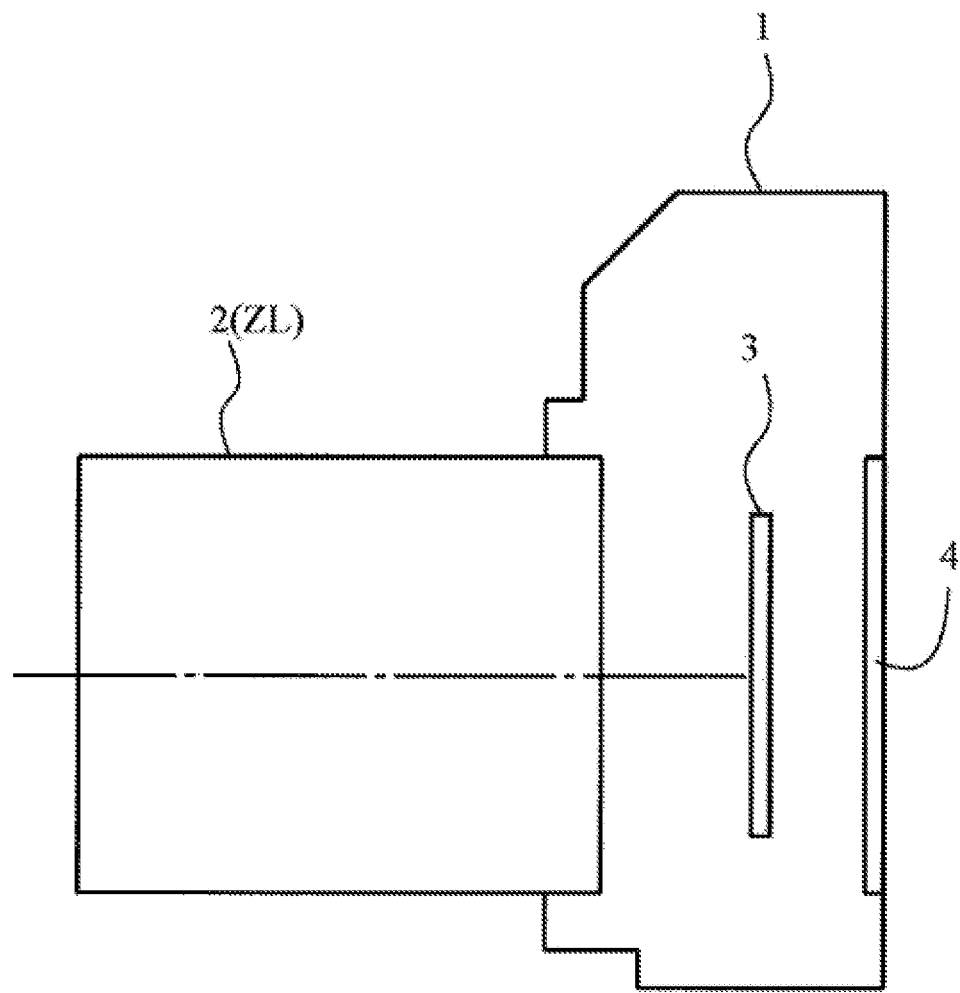
FIG. 17 is a cross-sectional diagram of a camera mounted with the above zoom optical system.

Next, a camera which is an optical apparatus provided with the zoom optical system ZL according to the present embodiment will be described based on FIG. 17. This camera 1 is a lens interchangeable, so-called mirrorless camera provided with the zoom optical system ZL according to the present embodiment as an imaging lens 2. In the present camera 1, light from an object (subject) (not shown) is collected by the imaging lens 2 to form an image of the subject on an imaging surface of an imaging section 3 via an OLPF (optical low pass filter) (not shown). The subject image is photoelectrically converted by a photoelectric conversion element provided in the imaging section 3 and the image of the subject is thereby generated. This image is displayed on an EVF (electronic view finder) 4 provided for the camera 1. This allows a photographer to observe the subject via the EVF 4.

When the photographer presses a release button (not shown), the image photoelectrically converted by the imaging section 3 is stored in a memory (not shown). Thus, the photographer can capture an image of the subject using the camera 1. Although an example of a mirrorless camera has been described in the present embodiment, effects similar to those of the above camera 1 can also be achieved with a single-lens reflex type camera mounted with the zoom optical system ZL according to the present embodiment, which is provided with a quick return mirror in a camera body to observe a subject through a finder optical system.

The contents described below can be adopted as appropriate in such a range as not to deteriorate optical performance.

Although a zoom optical system ZL with a four-group or five-group configuration has been described in the present embodiment, the above configuration and conditions are also applicable to a six-group, seven-group or other group configuration. A configuration with a lens or lens group added on a side closest to the object or a configuration with a lens or lens group added on a side closest to the image may be adopted. More specifically, a configuration may be conceived in which a lens group whose position with respect to the image surface is fixed on a side closest to the image surface upon zooming or upon focusing is added. The lens group refers to a part including at least one lens separated with an air distance which varies upon zooming or upon focusing. The lens component refers to a cemented lens made up of a single lens or a plurality of lenses cemented together.

A single lens or a plurality of lens groups or a partial lens group may be moved in the optical axis direction to be formed into a focusing group which performs focusing from an infinite distant object point to a short distant object point. In this case, the focusing group is also applicable to auto focusing and is also suitable for motor driving (ultrasonic motor or the like) for auto focusing. It is particularly preferable to use at least part of the second lens group G2 as a focusing group and fix the positions of the other lenses with respect to the image surface upon focusing. With a load applied to the motor taken into consideration, the focusing lens group is preferably constructed of a single lens.

The lens group or partial lens group may be moved so as to have a displacement component in a direction orthogonal to the optical axis or may be moved (swung) rotationally in an in-plane direction including the optical axis so as to serve as a vibration-isolating group that corrects image blur caused by image shake. It is particularly preferable to use at least part of the succeeding lens group GL (third lens group G3 or fourth lens group G4) as a vibration-isolating group.

Lens surfaces may be formed as spherical surfaces, plane surfaces or aspherical surfaces. When a lens surface is a spherical surface or a plane surface, lens working and assembly adjustment become easier, preventing deterioration of optical performance due to errors in working and assembly adjustment, which is therefore preferable. Even when an image surface is shifted, deterioration of description performance is small, which is therefore preferable. When a lens surface is an aspherical surface, the aspherical surface may be any one of an aspherical surface resulting from grinding work, a glass-mold aspherical surface which is glass molded into an aspherical shape and a composite type aspherical surface with resin formed into an aspherical shape on a glass surface. Lens surfaces may be refractive surfaces and lenses may be gradient index lenses (GRIN lenses) or plastic lenses.

An aperture stop S is preferably disposed in the neighborhood or within the succeeding lens group GL (third lens group G3 or fourth lens group G4), but the role of the aperture stop S may be substituted by a lens frame without providing any member as an aperture stop.

Each lens surface may be coated with an antireflective film exhibiting high transmissivity over a wide wavelength region to achieve high contrast and high optical performance while reducing flare or ghost.

The zoom optical system ZL of the present embodiment has a zooming rate of on the order of 2.0 to 3.5.

Figure 18:
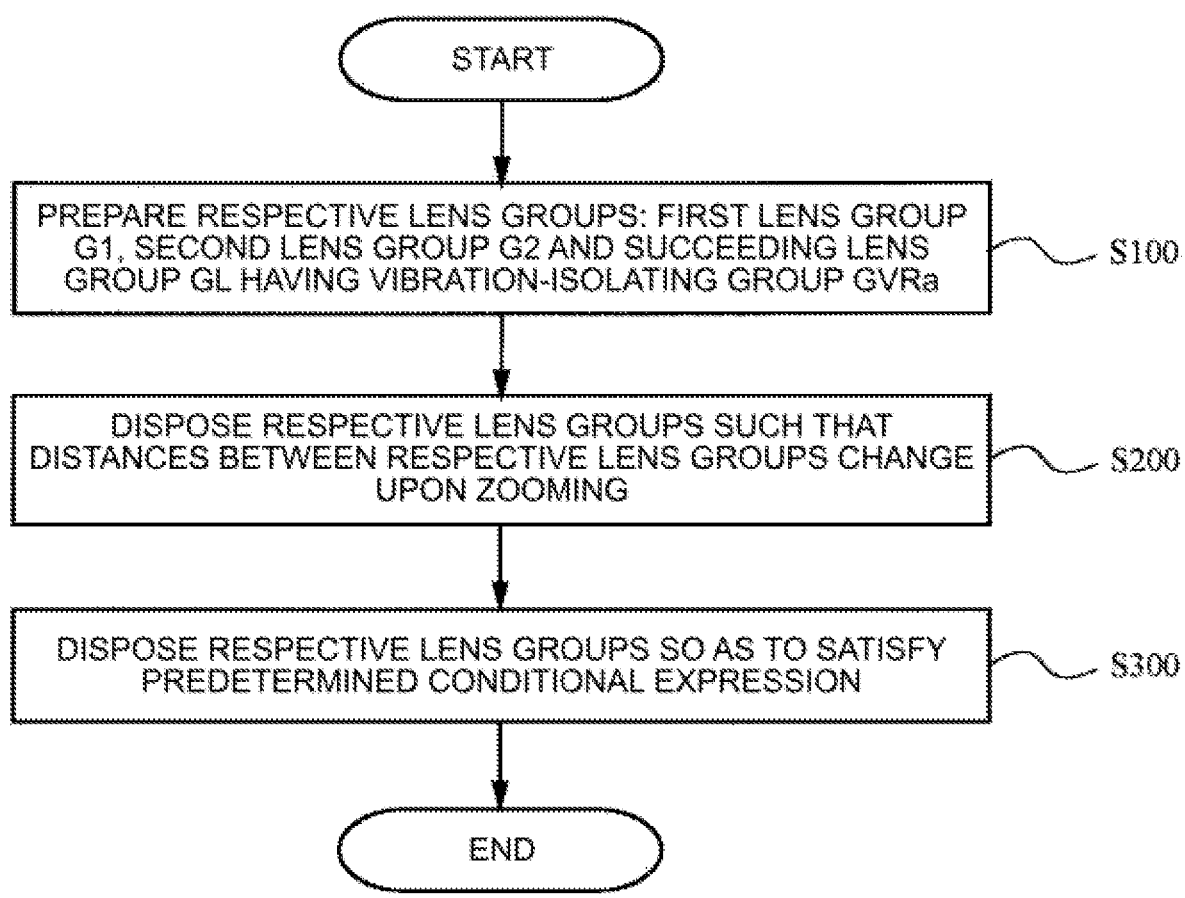
FIG. 18 is a flowchart for describing a method for manufacturing the above zoom optical system.

Hereinafter, an overview of a method for manufacturing the zoom optical system ZL according to the present embodiment will be described with reference to FIG. 18. First, the respective lenses are arranged, the first lens group G1, the second lens group G2 and the succeeding lens group GL having the vibration-isolating group GVRa are prepared respectively (step S100), and the lenses are disposed so that a distance between the first lens group G1 and the second lens group G2 changes and a distance between the second lens group G2 and the succeeding lens group GL changes upon zooming from a wide-angle end state to a telephoto end state (step S200). The lenses are then disposed so as to satisfy conditions according to a predetermined conditional expression (e.g., the aforementioned conditional expression (1)) (step S300).

More specifically, according to the present embodiment, as shown, for example, in FIG. 1, a negative meniscus lens L11 having a convex surface facing the object, a meniscus-shaped aspherical negative lens L12 having a convex surface facing the object, a meniscus-shaped aspherical negative lens L13 having a convex surface facing the object, a biconcave negative lens L14 and a biconvex positive lens L15 are disposed in order from the object to form the first lens group G1. A cemented negative lens resulting from cementing a negative meniscus lens L21 having a convex surface facing the object and a biconvex positive lens L22, a positive meniscus lens L23 having a convex surface facing the object and a positive meniscus lens L24 having a convex surface facing the object are disposed to form the second lens group G2. A biconvex positive lens L31 is disposed to form the third lens group G3, and a biconcave negative lens L41, a biconcave negative lens L42 and a positive meniscus lens L43 having a convex surface facing the object are disposed to form the fourth lens group G4 which is the succeeding lens group GL. A cemented positive lens resulting from cementing a negative meniscus lens L51 having a convex surface facing the object and a biconvex positive lens L52, a cemented positive lens resulting from cementing a negative meniscus lens L53 having a convex surface facing the object and a biconvex positive lens L54 and a cemented negative lens resulting from cementing a biconcave negative lens L55 and a biconvex aspherical surface positive lens L56 are disposed to form a fifth lens group G5. The zoom optical system ZL is manufactured by disposing the respective lens groups prepared using the aforementioned procedure.

Adopting the above configuration makes it possible to provide a zoom optical system ZL, an optical apparatus having the zoom optical system ZL and a method for manufacturing the zoom optical system ZL with an appropriate zoom configuration and an appropriate refractive power arrangement, provided with an image shake mechanism, an F value representing high brightness, a wide field angle, with various aberrations successfully corrected.

EXAMPLES

Hereinafter, examples of the present invention will be described based on the accompanying drawings. FIG. 1, FIG. 5, FIG. 9 and FIG. 13 are cross-sectional diagrams illustrating configurations of zoom optical systems ZL (ZL1 to ZL4) and refractive power distributions of the respective examples. Moving directions of the respective lens groups G1 to G4 (or G5) along the optical axis upon zooming from a wide-angle end state (W) through an intermediate focal length state (M) to a telephoto end state (T) are shown by arrows in lower parts of the cross-sectional diagrams of these zoom optical systems ZL1 to ZL4.

In the respective examples, each aspherical surface is expressed by the following expression (a), where y is a height in a direction perpendicular to the optical axis, S(y) is a distance (sag amount) from a tangential plane surface at a vertex of each aspherical surface to each aspherical surface at the height y along the optical axis, r is a radius of curvature (paraxial radius of curvature) of a reference spherical surface, K is a conical coefficient and An is an aspherical coefficient of n-th order. In the examples below, "E-n" represents "$\times 10^{-n}$."

$$S(y)=(y^2/r)/\{1+(1-K\times y^2/r^2)^{1/2}\}+A4\times y^4+A6\times y^6+A8\times y^8+A10\times y^{10} \quad (a)$$

In each example, a 2nd order aspherical coefficient A2 is 0. In tables in the respective examples, a sign "*" is marked on the right side of each surface number of each aspherical surface in tables in the respective examples.

Example 1

FIG. 1 is a diagram illustrating a configuration of the zoom optical system ZL1 according to Example 1. This zoom optical system ZL1 is constructed of a first lens group G1 having negative refractive power, a second lens group G2 having positive refractive power, a third lens group G3 having positive refractive power, a fourth lens group G4 which is a succeeding lens group GL having negative refractive power and a fifth lens group G5 having positive refractive power, which are disposed in order from an object.

In this zoom optical system ZL1, the first lens group G1 is constructed of a negative meniscus lens L11 having a convex surface facing the object, a negative meniscus lens L12 with a lens surface on the image side formed into an aspherical shape a negative meniscus lens L13 with an aspherical surface formed with a resin layer provided on a lens surface on the image side and having a convex surface facing the object, a biconcave negative lens L14 and a biconvex positive lens L15, which are disposed in order from the object. The second lens group G2 is constructed of a cemented negative lens resulting from cementing a negative meniscus lens L21 having a convex surface facing the object and a biconvex positive lens L22, a positive meniscus lens L23 having a convex surface facing the object and a positive meniscus lens L24 having a convex surface facing the object, which are disposed in order from the object. The third lens group G3 is constructed of a biconvex positive lens L31. The fourth lens group G4 is constructed of a biconcave negative lens L41, a biconcave negative lens L42 and a positive meniscus lens L43 having a convex surface facing the object, which are disposed in order from the object. The fifth lens group G5 is constructed of a cemented positive lens resulting from cementing a negative meniscus lens L51 having a convex surface facing the object and a biconvex positive lens L52, a cemented positive lens resulting from cementing a negative meniscus lens L53 having a convex surface facing the object and a biconvex positive lens L54 and a cemented negative lens resulting from cementing a biconcave negative lens L55 and a biconvex positive lens L56 with a lens surface on the image side formed into an aspherical shape, which are disposed in order from the object. An aperture stop S is disposed between the third lens group G3 and the fourth lens group G4. In Example 1, four lens components, that is, negative, positive, positive and positive lens components are disposed between the first lens group G1 and the succeeding lens group GL.

The zoom optical system ZL1 is configured such that upon zooming from a wide-angle end state to a telephoto end state, the first lens group G1, the second lens group G2, the third lens group G3, the aperture stop S, the fourth lens group G4 and the fifth lens group G5 move along the optical axis, and upon zooming, a distance between the first lens group G1 and the second lens group G2 decreases, a distance between the second lens group G2 and the third lens group G3 increases, a distance between the third lens group G3 and the aperture stop S increases, a distance between the aperture stop S and the fourth lens group G4 changes, a distance between the fourth lens group G4 and the fifth lens group G5 decreases, and a distance (back focus, which will be described later) between the fifth lens group G5 and an image surface I increases.

In this zoom optical system ZL1, the lenses located between the first lens group G1 and the fourth lens group G4 which is the succeeding lens group GL are the lenses of the second lens group G2 which is a front group GFa having positive refractive power and the third lens group G3 which is a rear group GFb having positive refractive power, and are configured to achieve focusing from an infinite distant object point to a short distant object point by using the entire second lens group G2 as the focusing group GFa and moving the focusing group GFa toward the image.

In the zoom optical system ZL1, the image position when image shake occurs is corrected (vibration isolation) by using, as a vibration-isolating group GVRb, the biconcave negative lens L42 and the positive meniscus lens L43 in the fourth lens group G4 which is the succeeding lens group GL and moving the vibration-isolating group GVRb so as to have a displacement component in a direction orthogonal to the optical axis. This vibration-isolating group GVRb has negative refractive power. In order to correct rotation blur with an angle θ of a lens in which the whole system has a focal length of f and a vibration proof coefficient of K (ratio of an amount of image movement on the image forming surface to an amount of movement of the vibration-isolating group GVRb through correction at the image position when image shake occurs), the vibration-isolating lens group Gvr needs only to be moved by (f·tan θ)/K in a direction orthogonal to the optical axis (the same applies to the subsequent examples). In the wide-angle end state according to Example 1, since the vibration proof coefficient is −0.27 and the focal length is 14.40 [mm], the amount of movement of the vibration-isolating group GVRb for correcting rotation blur of 0.50° is −0.46 [mm]. In the intermediate focal length state of Example 1, since the vibration proof coefficient is −0.29 and the focal length is 17.23 [mm], the amount of movement of the vibration-isolating group GVRb to correct rotation blur of 0.50° is −0.52 [mm]. In the telephoto end state of Example 1, since the vibration proof coefficient is −0.37 and the focal length is 27.39 [mm], the amount of movement of the vibration-isolating group GVRb to correct rotation blur of 0.50° is −0.65 [mm]. The biconcave negative lens L41 having negative refractive power corresponds to the object-side group GVRa.

Table 1 below shows data values of the zoom optical system ZL1. Among overall data shown in Table 1, f denotes a focal length of the whole system, FNO denotes an F number, ω denotes a half angle of view [°], Y denotes a maximum image height, TL denotes a total length, and BF denotes a back focus value for each wide-angle end state, intermediate focal length state and telephoto end state. The total length TL represents a distance on the optical axis from a lens surface (first surface) closest to the object to the image surface I upon focusing on infinity. The back focus BF represents a distance on the optical axis (air equivalent length) from the lens surface (36th surface) closest to the image to the image surface I upon focusing on infinity. A first column m in lens data represents lens surface order (surface number) from the object along a light traveling direction, a second column r represents a radius of curvature of each lens surface, a third column d represents a distance from each optical surface to the next optical surface (distance to the next lens surface) on the optical axis, a fourth column nd and a fifth column vd represent a refractive index and an Abbe number for a d-line (λ=587.6 nm). A radius of curvature 0.00000 represents a plane surface and a refractive index of air 1.00000 is omitted. A lens group focal length indicates a surface number and a focal length of a starting surface of each lens group.

As the unit for the focal length f, the radius of curvature r, the distance to the next lens surface d and other lengths described in all the following data, "mm" is generally used, but the unit is not limited to "mm" since equivalent optical performance is obtained even when an optical system is proportionally scaled. Explanations of these numerals and characters, and data are the same in the following examples.

TABLE 1

Example 1

[Overall data]

|  | Wide-angle end state | | Intermediate focal length state | | Telephoto end state |
| --- | --- | --- | --- | --- | --- |
| f = | 14.40 | ~ | 17.23 | ~ | 27.39 |
| FNo = | 2.91 | ~ | 2.89 | ~ | 2.89 |
| ω [°] = | 57.5 | ~ | 51.6 | ~ | 37.5 |
| Y = | 21.60 | ~ | 21.60 | ~ | 21.60 |
| TL = | 207.441 | ~ | 200.685 | ~ | 194.082 |
| BF = | 38.105 | ~ | 40.845 | ~ | 53.650 |
| BF (Air equivalent length) = | 38.105 | ~ | 40.845 | ~ | 53.650 |

[Lens data]

| m | r | d | nd | νd |
| --- | --- | --- | --- | --- |
| Object surface | ∞ | | | |
| 1 | 55.00000 | 3.000 | 1.80400 | 46.6 |
| 2 | 33.50000 | 10.427 | | |
| 3 | 51.62844 | 2.800 | 1.74389 | 49.5 |
| 4* | 20.67504 | 14.000 | | |
| 5 | 200.00000 | 1.900 | 1.74100 | 52.7 |
| 6 | 45.64422 | 0.200 | 1.56093 | 36.6 |
| 7* | 50.13418 | 10.179 | | |
| 8 | −75.13583 | 2.000 | 1.59319 | 67.9 |
| 9 | 550.33482 | 0.200 | | |
| 10 | 67.70943 | 5.778 | 1.88300 | 40.8 |
| 11 | −402.55306 | D11 | | |
| 12 | 177.49958 | 1.150 | 1.77250 | 49.6 |
| 13 | 30.49583 | 5.835 | 1.48749 | 70.4 |
| 14 | −230.74721 | 0.200 | | |
| 15 | 149.51579 | 2.030 | 1.48749 | 70.4 |
| 16 | 3489.21250 | 0.200 | | |
| 17 | 70.18794 | 2.622 | 1.77250 | 49.6 |
| 18 | 414.22996 | D18 | | |
| 19 | 263.50107 | 3.241 | 1.43700 | 95.1 |
| 20 | −57.92782 | D20 | | |
| 21 | 0.00000 | D21 | | Aperture stop S |
| 22 | −59.84186 | 1.150 | 1.59349 | 67.0 |
| 23 | 1425.54440 | 2.500 | | |
| 24 | −91.74637 | 1.150 | 1.69680 | 55.5 |
| 25 | 57.64649 | 0.239 | | |
| 26 | 59.91277 | 2.700 | 1.90200 | 25.3 |
| 27 | 995.42001 | D27 | | |
| 28 | 30.00000 | 1.728 | 1.74100 | 52.7 |
| 29 | 21.96258 | 8.500 | 1.49782 | 82.5 |
| 30 | −102.29375 | 1.365 | | |
| 31 | 37.40001 | 1.150 | 1.81600 | 46.6 |
| 32 | 19.57636 | 10.175 | 1.55332 | 71.7 |
| 33 | −44.35841 | 1.026 | | |
| 34 | −42.75639 | 1.150 | 1.90265 | 35.7 |
| 35 | 42.01112 | 6.189 | 1.59319 | 67.9 |
| 36* | −50.95836 | BF | | |
| Image surface | ∞ | | | |

[Lens group focal length]

| Lens group | Starting surface | Focal length |
| --- | --- | --- |
| First lens group | 1 | −28.82 |
| Second lens group | 12 | 103.32 |
| Third lens group | 19 | 109.00 |
| Fourth lens group | 22 | −62.73 |
| Fifth lens group | 28 | 43.95 |

The 4th surface, the 7th surface and the 36th surface in the zoom optical system ZL1 are formed into aspherical shapes. Table 2 below shows aspherical surface data, that is, conical coefficient K and values of respective aspherical surface constants A4 to A10.

TABLE 2

[Aspherical surface data]

| m | K | A4 | A6 | A8 | A10 |
|---|---|---|---|---|---|
| 4 | −2.46000e−02 | 7.88053e−07 | 3.76444e−09 | 1.16470e−12 | 0.00000e+00 |
| 7 | 4.36800e−01 | 5.36445e−06 | −5.62569e−09 | 2.32198e−12 | 0.00000e+00 |
| 36 | 1.26020e+00 | 8.86603e−06 | 3.65812e−09 | 0.00000e+00 | 0.00000e+00 |

In this zoom optical system ZL1, an axial air distance D11 between the first lens group G1 and the second lens group G2, an axial air distance D18 between the second lens group G2 and the third lens group G3, an axial air distance D20 between the third lens group G3 and the aperture stop S, an axial air distance D21 between the aperture stop S and the fourth lens group G4, an axial air distance D27 between the fourth lens group G4 and the fifth lens group G5 and the back focus BF vary upon zooming as described above. Table 3 below shows variable distances in respective focal length states: wide-angle end state (W) in an infinity focusing state, intermediate focal length state (M) and telephoto end state (T). D0 represents a distance from the surface closest to the object (first surface) of the zoom optical system ZL1 to the object and f represents a focal length (the same applies to the subsequent examples).

TABLE 3

[Variable distance data]

| | W | M | T |
|---|---|---|---|
| D0 | ∞ | ∞ | ∞ |
| f | 14.40 | 17.23 | 27.39 |
| D11 | 32.973 | 21.896 | 1.300 |
| D18 | 9.159 | 10.341 | 14.876 |
| D20 | 2.000 | 5.151 | 14.545 |
| D21 | 2.660 | 3.799 | 3.225 |
| D27 | 17.759 | 13.867 | 1.700 |
| BF | 38.105 | 40.845 | 53.650 |

Table 4 below shows respective conditional expression corresponding values in the present zoom optical system ZL1. In Table 4, f1VRaw denotes a composite focal length in a wide-angle end state of a lens disposed closer to the object than the vibration-isolating group GVRb, fw denotes a focal length of the whole system in the wide-angle end state, βaw denotes image forming magnification of the object-side group GVRa in a wide-angle end state, f1 denotes a focal length of the first lens group G1 and f2 denotes a focal length of the second lens group G2. Explanations of these numerals and characters are the same in the following examples.

TABLE 4 f1VRaw=−562.587
[Conditional expression corresponding value]
(1) |f1VRaw/fw|=39.069
(2) βaw=−19.194
(3) (−f1)/f2=0.279

Thus, the zoom optical system ZL1 satisfies all the above conditional expressions (1) to (3).

Figure 2A:
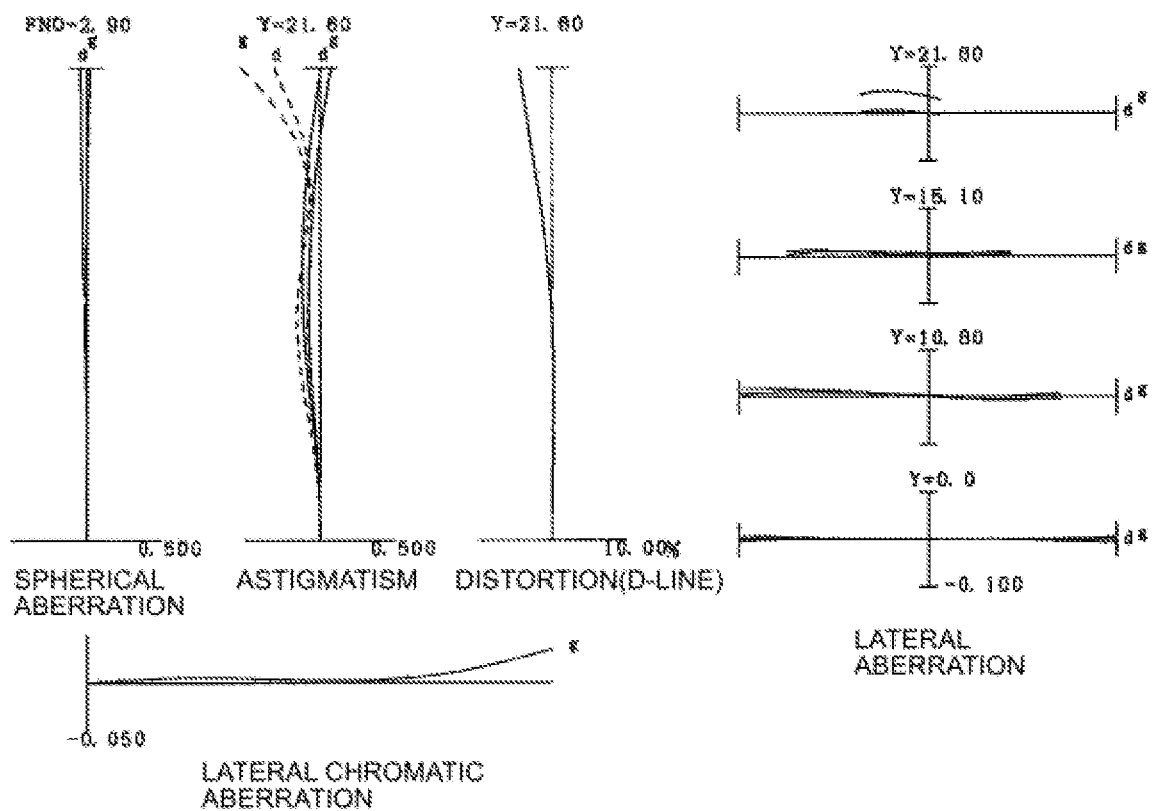
FIGS. 2A and 2B illustrate various aberration graphs of the zoom optical system according to Example 1 in a wide-angle end state, FIG. 2A illustrating various aberration graphs in an infinity focusing state and FIG. 2B illustrating a lateral aberration graph in an infinity focusing state when image shake is corrected.
Figure 2B:
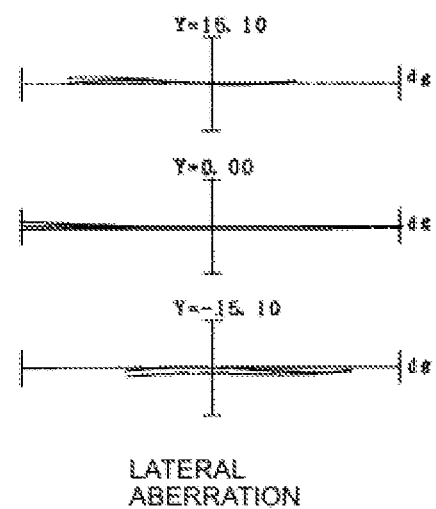
Figure 3A:
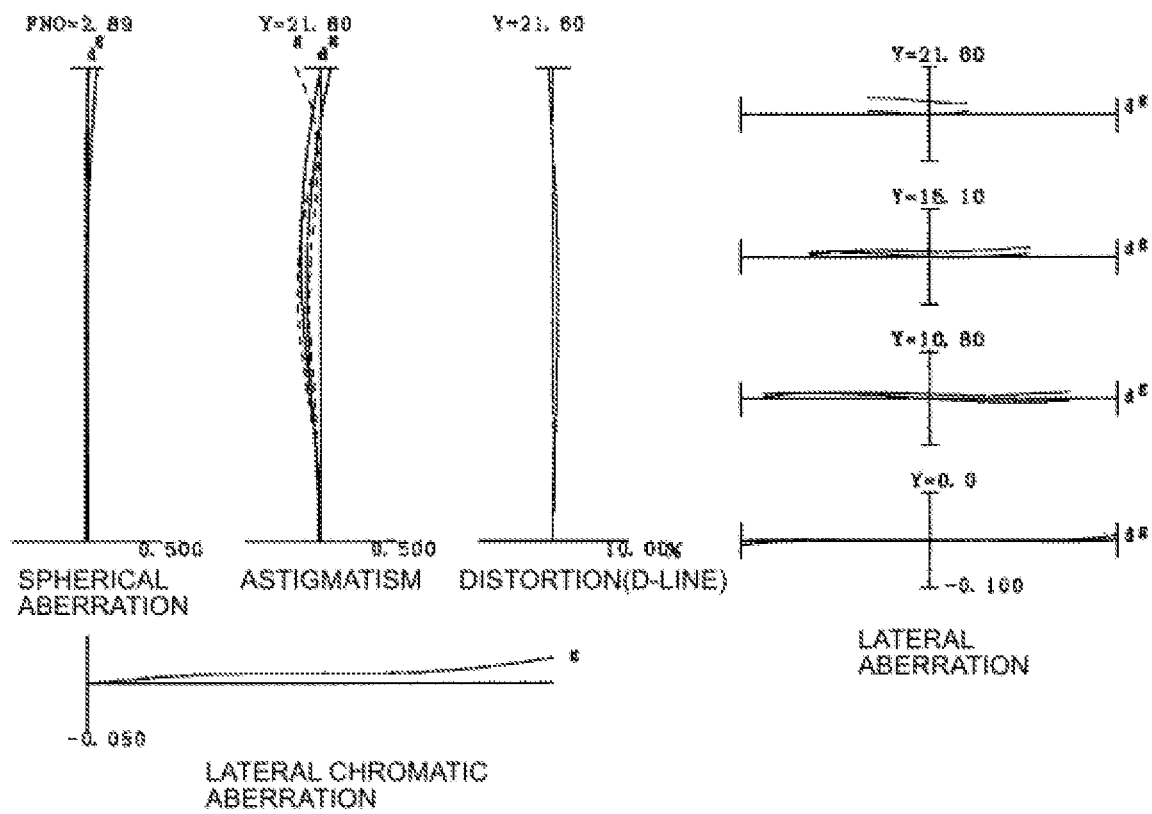
FIGS. 3A and 3B illustrate various aberration graphs of the zoom optical system according to Example 1 in an intermediate focal length state, FIG. 3A illustrating various aberration graphs in an infinity focusing state and FIG. 3B illustrating a lateral aberration graph in an infinity focusing state when image shake is corrected.
Figure 3B:
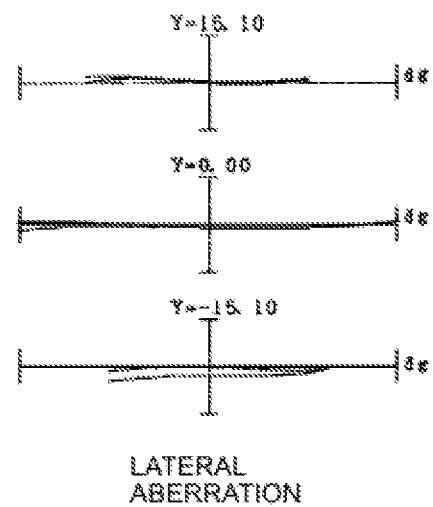
Figure 4A:
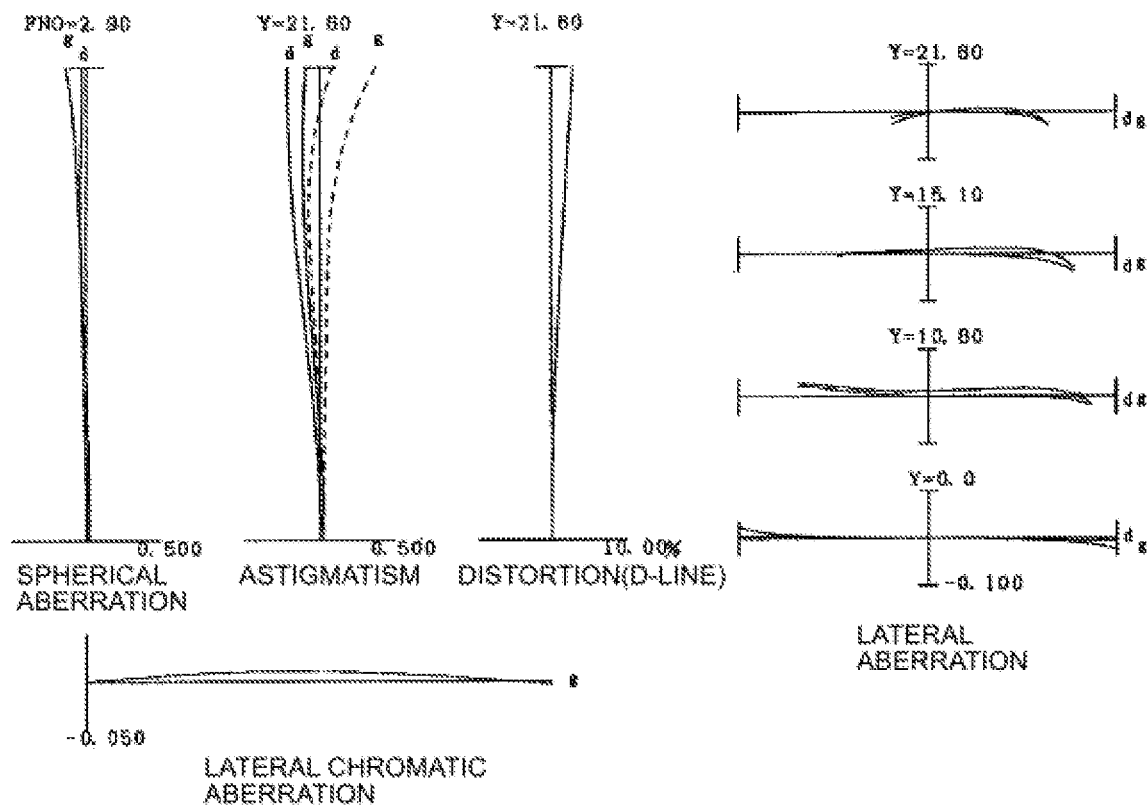
FIGS. 4A and 4B illustrate various aberration graphs of the zoom optical system according to Example 1 in a telephoto end state, FIG. 4A illustrating various aberration graphs in an infinity focusing state and FIG. 4B illustrating a lateral aberration graph in an infinity focusing state when image shake is corrected.
Figure 4B:
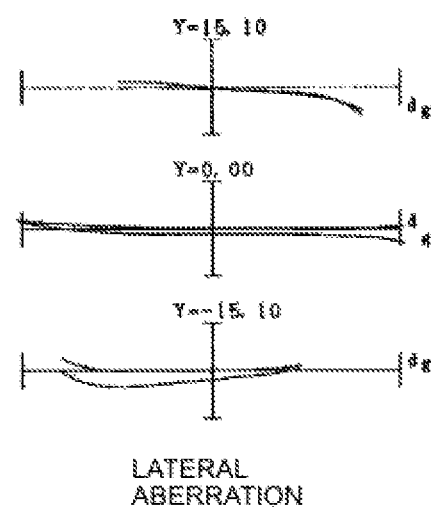

A spherical aberration graph, an astigmatism graph, a distortion graph, a lateral chromatic aberration graph and a lateral aberration graph in a wide-angle end state upon focusing on infinity, an intermediate focal length state and a telephoto end state of the zoom optical system ZL1 are shown in FIG. 2A, FIG. 3A and FIG. 4A, and lateral aberration graphs in the wide-angle end state upon focusing on infinity, the intermediate focal length state and the telephoto end state when image shake is corrected are shown in FIG. 2B, FIG. 3B and FIG. 4B. In each aberration graph, FNO denotes an F number and Y denotes an image height. An F number value corresponding to a maximum diameter is shown in a spherical aberration graph, maximum values of an image height are shown in an astigmatism graph and a distortion graph, and a value of each image height is shown in a lateral aberration graph. A reference character d denotes a d-line ($\lambda$=587.6 nm) and g denotes a g-line ($\lambda$=435.8 nm). In the astigmatism graph, the solid line shows a sagittal image surface and a broken line shows a meridional image surface. In aberration graphs in the respective examples shown hereinafter, signs similar to those of the present example are used. It is clear from these aberration graphs that various aberrations have been successfully corrected from a wide-angle end state to a telephoto end state in this zoom optical system ZL1.

Example 2

Figure 5:
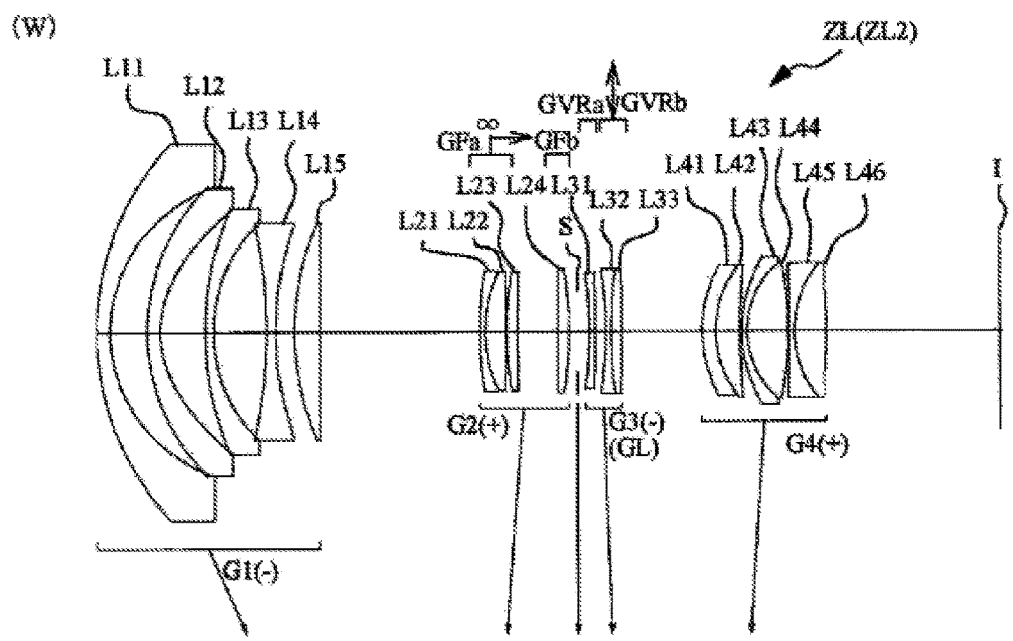
FIG. 5 is a cross-sectional diagram illustrating a lens configuration of a zoom optical system according to Example 2, where (W) denotes a wide-angle end state, (M) denotes an intermediate focal length state and (T) denotes a telephoto end state.
Figure 5:
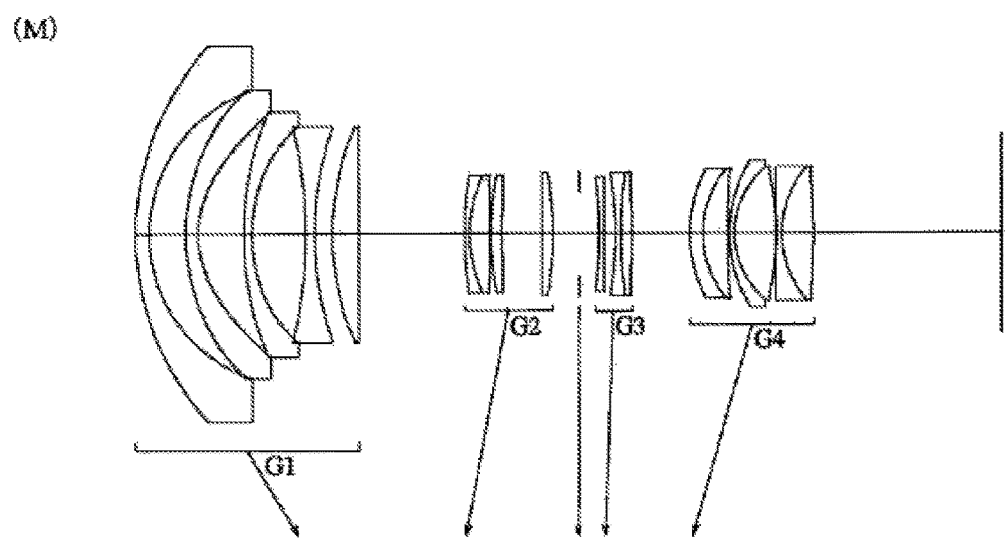
Figure 5:
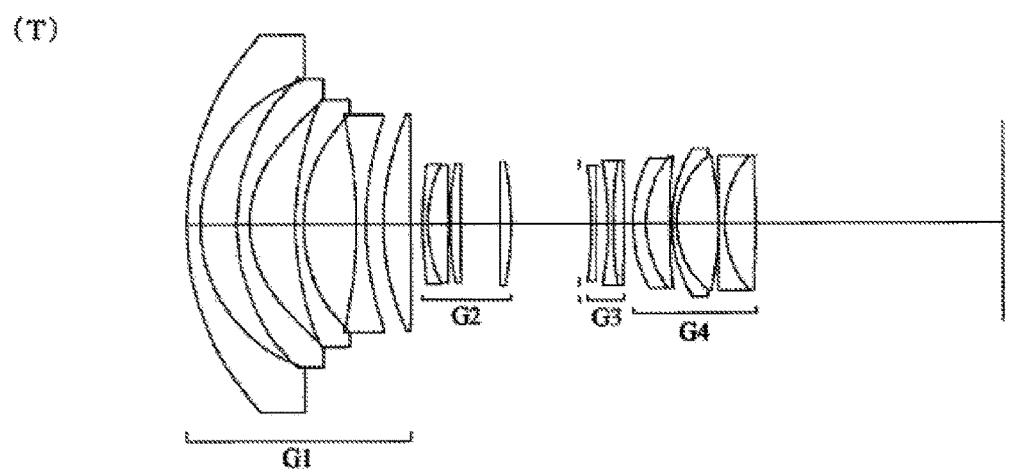

FIG. 5 is a diagram illustrating a configuration of a zoom optical system ZL2 according to Example 2. This zoom optical system ZL2 is constructed of a first lens group G1 having negative refractive power, a second lens group G2 having positive refractive power, a third lens group G3 which is a succeeding lens group GL having negative refractive power and a fourth lens group G4 having positive refractive power, which are disposed in order from an object.

In this zoom optical system ZL2, the first lens group G1 is constructed of a negative meniscus lens L11 having a convex surface facing the object, a negative meniscus lens L12 with a lens surface on the image side formed into an aspherical shape and having a convex surface facing the object, a negative meniscus lens L13 with a lens surface on the image side formed into an aspherical shape and having a convex surface facing the object, a biconcave negative lens L14 and a biconvex positive lens L15, which are disposed in order from the object. The second lens group G2 is constructed of a cemented negative lens resulting from cementing a negative meniscus lens L21 having a convex surface facing the object and a biconvex positive lens L22, a positive meniscus lens L23 having a convex surface facing the object and a biconvex positive lens L24, which are disposed in order from the object. The third lens group G3 is constructed of a negative meniscus lens L31 having a concave surface facing the object and a cemented negative lens resulting from cementing a biconcave negative lens L32 and a biconvex positive lens L33, which are disposed in order from the object. The fourth lens group G4 is constructed of a cemented positive lens resulting from cementing a negative meniscus lens L41 having a convex surface facing the object and a positive meniscus lens L42 having a convex surface facing the object, a cemented positive lens resulting from cementing a negative meniscus lens L43 having a convex surface facing the object and a biconvex positive lens L44 and a cemented negative lens resulting from cementing a biconcave negative lens L45 and a biconvex positive lens L46 with a lens surface on the image side formed into an aspherical shape, which are disposed in order from the object. An aperture stop S is disposed between the second lens group G2 and the third lens group G3. In Example 2, three lens components, that is, negative, positive and positive lens components are disposed between the first lens group G1 and the succeeding lens group GL.

The zoom optical system ZL2 is configured such that upon zooming from a wide-angle end state to a telephoto end state, the first lens group G1, the second lens group G2, the aperture stop S, the third lens group G3 and the fourth lens group G4 move along the optical axis, and upon zooming, a distance between the first lens group G1 and the second lens group G2 decreases, a distance between the second lens group G2 and the aperture stop S increases, a distance between the aperture stop S and the third lens group G3 changes, a distance between the third lens group G3 and the fourth lens group G4 decreases and a distance between the fourth lens group G4 and an image surface I (back focus, which will be described later) increases.

In this zoom optical system ZL2, the lenses located between the first lens group G1 and the third lens group G3 which is the succeeding lens group GL are the lenses of the second lens group G2. This second lens group G2 includes, in order from the object, a cemented negative lens resulting from cementing the negative meniscus lens L21 and the biconvex positive lens L22, a front group GFa having positive refractive power made up of the positive meniscus lens L23 and a rear group GFb having positive refractive power made up of the biconvex positive lens L24. Focusing from an infinite distant object point to a short distant object point is performed by moving the front group GFa of the second lens group G2 toward the image as a focusing group.

In the zoom optical system ZL2, the image position when image shake occurs is corrected (vibration isolation) by using, as a vibration-isolating group GVRb, a cemented negative lens resulting from cementing the biconcave negative lens L32 and the biconvex positive lens L33 in the third lens group G3 which is the succeeding lens group GL and moving the vibration-isolating group GVRb so as to have a displacement component in a direction orthogonal to the optical axis. This vibration-isolating group GVRb has negative refractive power. In a wide-angle end state in Example 2, since the vibration proof coefficient is −0.32 and the focal length is 14.40 [mm], an amount of movement of the vibration-isolating group GVRb to correct rotation blur of 0.50° is 0.39 [mm]. In the intermediate focal length state of Example 2, since the vibration proof coefficient is −0.34 and the focal length is 17.52 [mm], the amount of movement of the vibration-isolating group GVRb to correct rotation blur of 0.50° is −0.45 [mm]. In the telephoto end state of Example 2, since the vibration proof coefficient is −0.43 and the focal length is 27.40 [mm], the amount of movement of the vibration-isolating group GVRb to correct rotation blur of 0.50° is −0.55 [mm]. The negative meniscus lens L31 having negative refractive power corresponds to the object-side group GVRa.

Table 5 below shows data values of the zoom optical system ZL2.

TABLE 5

Example 2

[Overall data]

|  | Wide-angle end state | | Intermediate focal length state | | Telephoto end state |
| --- | --- | --- | --- | --- | --- |
| f = | 14.40 | ~ | 17.52 | ~ | 27.40 |
| FNo = | 2.91 | ~ | 2.92 | ~ | 2.89 |
| ω[°] = | 57.5 | ~ | 50.9 | ~ | 37.5 |
| Y = | 21.60 | | 21.60 | | 21.60 |
| TL = | 198.658 | ~ | 190.438 | ~ | 179.318 |
| BF = | 38.136 | ~ | 41.168 | ~ | 54.038 |
| BF (Air equivalent length) = | 38.136 | ~ | 41.168 | ~ | 54.038 |

[Lens data]

| m | r | d | nd | vd |
| --- | --- | --- | --- | --- |
| Object surface | ∞ | | | |
| 1 | 60.00007 | 3.000 | 1.80400 | 46.6 |
| 2 | 32.99999 | 8.000 | | |
| 3 | 43.66262 | 2.800 | 1.69350 | 53.2 |
| 4* | 21.77326 | 10.000 | | |
| 5 | 66.75791 | 1.900 | 1.74100 | 52.7 |
| 6* | 35.89476 | 11.677 | | |
| 7 | −102.20375 | 2.000 | 1.61800 | 63.4 |
| 8 | 68.44125 | 3.953 | | |
| 9 | 57.59931 | 5.905 | 1.88300 | 40.8 |
| 10 | −8353.97890 | D10 | | |
| 11 | 86.93551 | 1.150 | 1.81600 | 46.6 |
| 12 | 30.24772 | 4.604 | 1.48749 | 70.4 |
| 13 | −635.62903 | 0.200 | | |
| 14 | 68.69195 | 2.462 | 1.77250 | 49.6 |
| 15 | 721.76917 | 8.778 | | |

TABLE 5-continued

[Example 2]

| | | | | |
|---|---|---|---|---|
| 16 | 1048.37080 | 2.410 | 1.59349 | 67.0 |
| 17 | −78.39834 | D17 | | |
| 18 | 0.00000 | D18 | | Aperture stop S |
| 19 | −96.51685 | 1.150 | 1.59349 | 67.0 |
| 20 | −4313.74880 | 2.500 | | |
| 21 | −77.26639 | 1.150 | 1.72916 | 54.7 |
| 22 | 97.91601 | 2.373 | 1.80809 | 22.8 |
| 23 | −388.14126 | D23 | | |
| 24 | 30.00000 | 2.856 | 1.74100 | 52.7 |
| 25 | 22.73754 | 5.338 | 1.49782 | 82.5 |
| 26 | 155.18278 | 0.400 | | |
| 27 | 30.41105 | 1.150 | 1.81600 | 46.6 |
| 28 | 19.08159 | 9.044 | 1.55332 | 71.7 |
| 29 | −68.93485 | 0.200 | | |
| 30 | −508.10216 | 1.150 | 1.90265 | 35.7 |
| 31 | 22.37987 | 6.933 | 1.59319 | 67.9 |
| 32* | −96.52428 | BF | | |
| Image surface | ∞ | | | |

[Lens group focal length]

| Lens group | Starting surface | Focal length |
|---|---|---|
| First lens group | 1 | −28.80 |
| Second lens group | 11 | 59.73 |
| Third lens group | 19 | −79.26 |
| Fourth lens group | 24 | 44.90 |

In the zoom optical system ZL2, the 4th, 6th and 32nd surfaces are formed into aspherical shapes. Table 6 below shows aspherical surface data, that is, conical coefficient K and values of the respective aspherical surface constants A4 to A10.

TABLE 6

[Aspherical surface data]

| m | K | A4 | A6 | A8 | A10 |
|---|---|---|---|---|---|
| 4 | 3.43000e−02 | −3.51269e−07 | −1.01786e−09 | 9.51759e−14 | 0.00000e+00 |
| 6 | −3.91000e−02 | 6.73249e−06 | 2.01986e−09 | 0.00000e+00 | 0.00000e+00 |
| 32 | −1.68440e+00 | 1.12313e−05 | 1.05750e−08 | 0.00000e+00 | 0.00000e+00 |

In this zoom optical system ZL2, an axial air distance D10 between the first lens group G1 and the second lens group G2, an axial air distance D17 between the second lens group G2 and the aperture stop S, an axial air distance D18 between the aperture stop S and the third lens group G3, an axial air distance D23 between the third lens group G3 and the fourth lens group G4 and the back focus BF vary upon zooming as described above. Table 7 below shows variable distances in respective focal length states: wide-angle end state (W) in an infinity focusing state, intermediate focal length state (M) and telephoto end state (T).

TABLE 7

[Variable distance data]

| | W | M | T |
|---|---|---|---|
| D0 | ∞ | ∞ | ∞ |
| f | 14.40 | 17.52 | 27.40 |
| D10 | 35.272 | 23.314 | 2.681 |
| D17 | 2.000 | 5.735 | 14.889 |
| D18 | 2.406 | 4.300 | 2.725 |

TABLE 7-continued

[Variable distance data]

| | W | M | T |
|---|---|---|---|
| D23 | 17.760 | 12.837 | 1.900 |
| BF | 38.136 | 41.168 | 54.038 |

Table 8 below shows respective conditional expression corresponding values of the zoom optical system ZL2.

TABLE 8 f1VRaw=126.415
[Conditional expression corresponding value]
(1) |f1VRaw/fw|=8.779
(2) βaw=3.635
(3) (−f1)/f2=0.482

Thus, the zoom optical system ZL2 satisfies all the above conditional expressions (1) to (3).

Figure 6A:
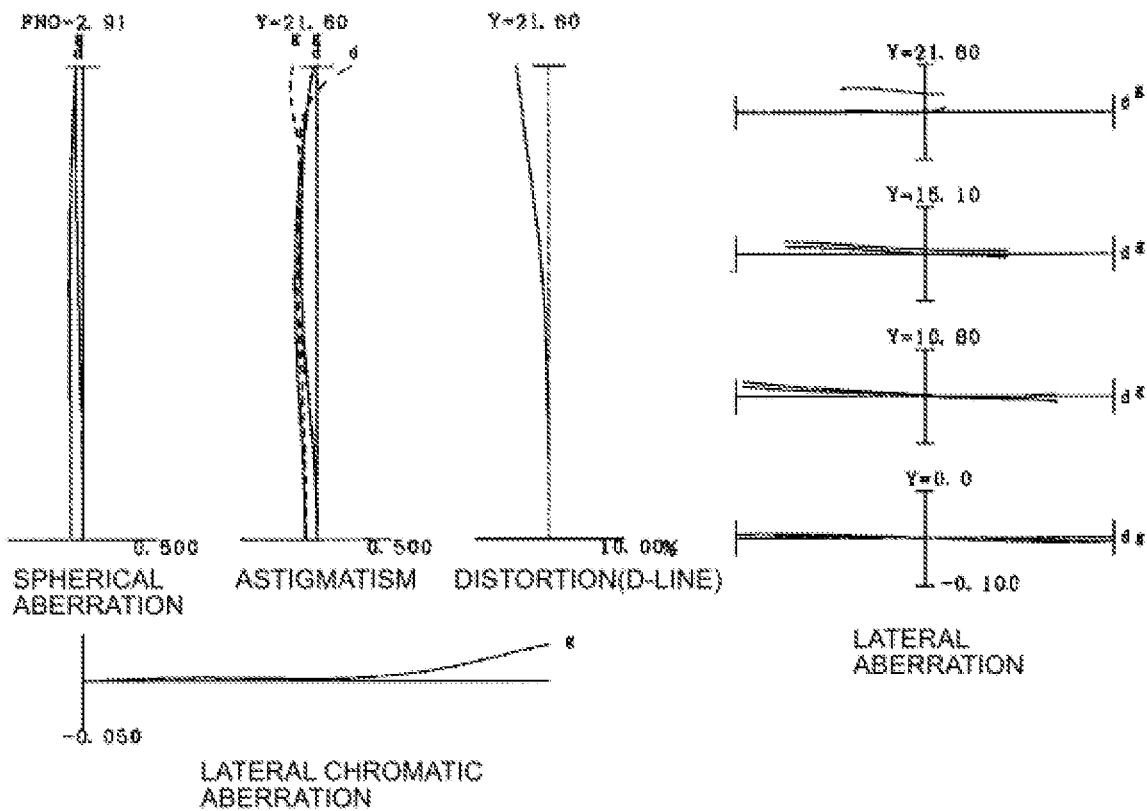
FIGS. 6A and 6B illustrate various aberration graphs of the zoom optical system according to Example 2 in a wide-angle end state, FIG. 6A illustrating various aberration graphs in an infinity focusing state and FIG. 6B illustrating a lateral aberration graph in an infinity focusing state when image shake is corrected.
Figure 6B:
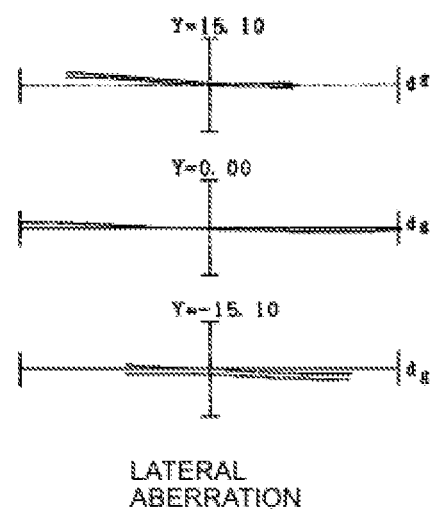
Figure 7A:
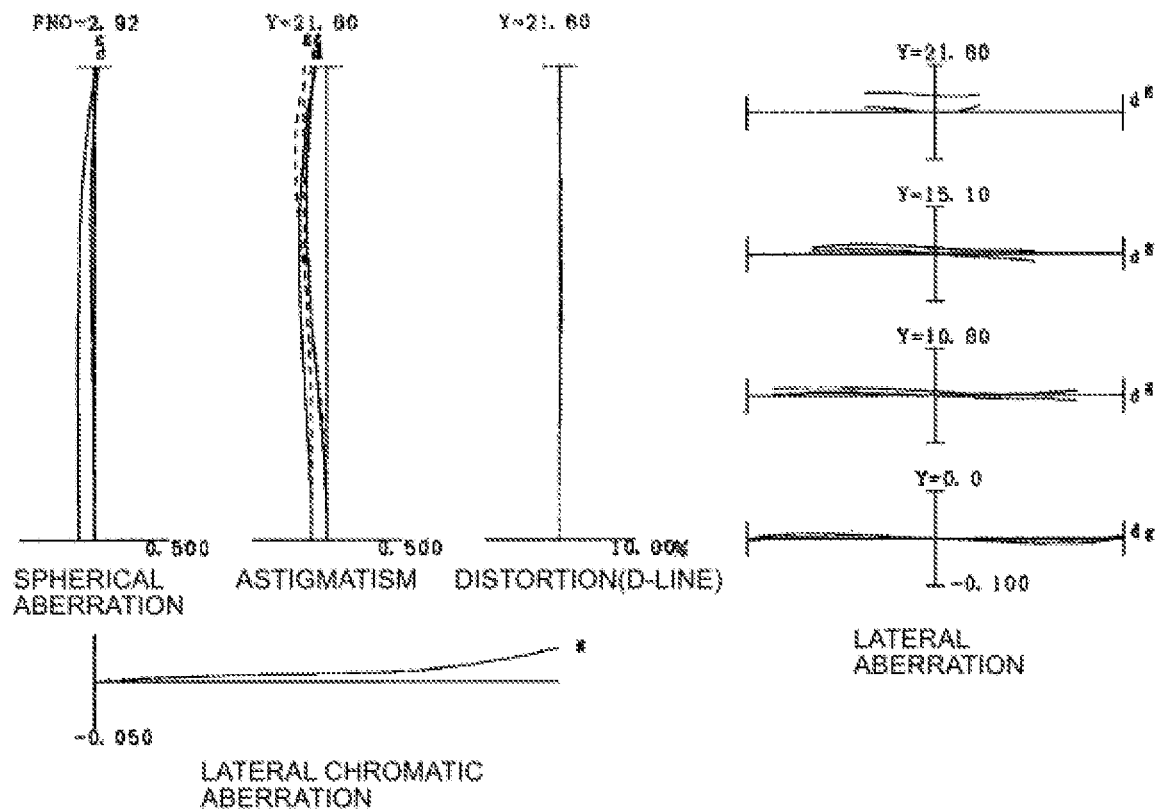
FIGS. 7A and 7B illustrate various aberration graphs of the zoom optical system according to Example 2 in an intermediate focal length state, FIG. 7A illustrating various aberration graphs in an infinity focusing state and FIG. 7B illustrating a lateral aberration graph in an infinity focusing state when image shake is corrected.
Figure 7B:
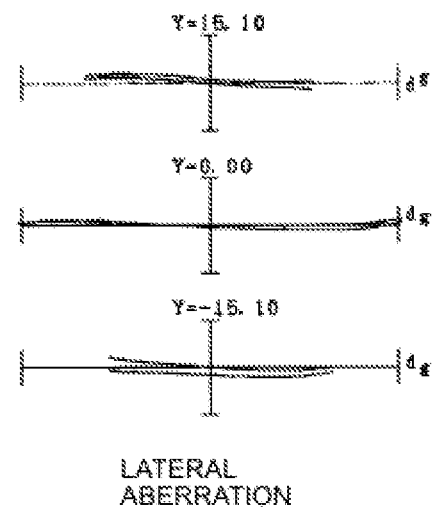
Figure 8A:
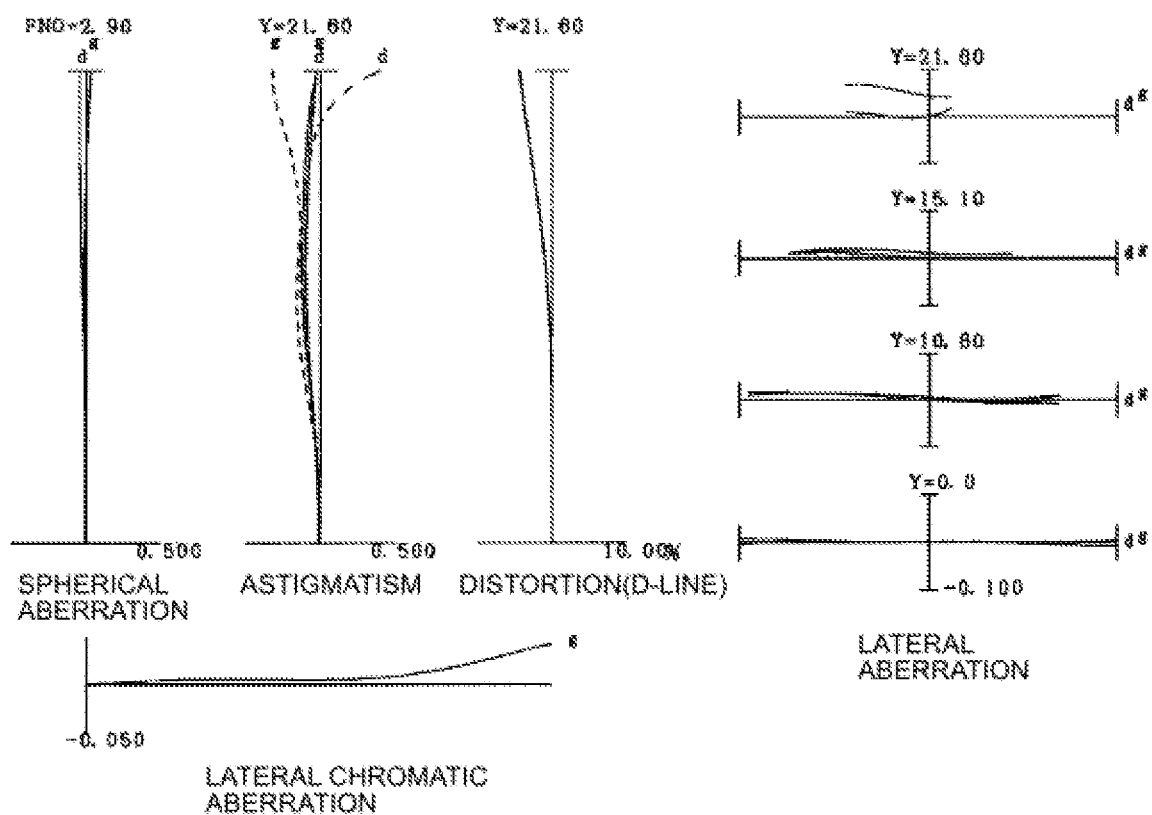
FIGS. 8A and 8B illustrate various aberration graphs of the zoom optical system according to Example 2 in a telephoto end state, FIG. 8A illustrating various aberration graphs in an infinity focusing state and FIG. 8B illustrating a lateral aberration graph in an infinity focusing state when image shake is corrected.
Figure 8B:
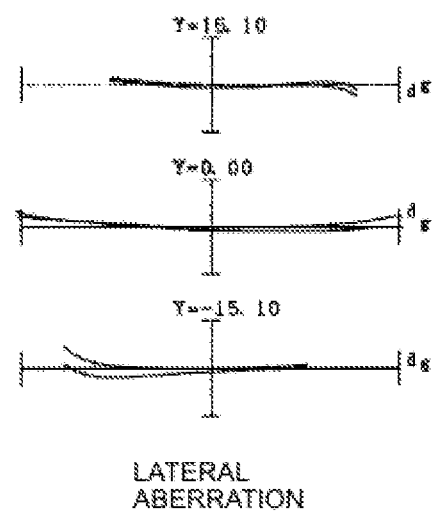

A spherical aberration graph, an astigmatism graph, a distortion graph, a lateral chromatic aberration graph and a lateral aberration graph in a wide-angle end state upon focusing on infinity, an intermediate focal length state and a telephoto end state of the zoom optical system ZL2 are shown in FIG. 6A, FIG. 7A and FIG. 8A, and lateral aberration graphs when image shake is corrected in the wide-angle end state upon focusing on infinity, the intermediate focal length state and the telephoto end state are shown in FIG. 6B, FIG. 7B and FIG. 8B. It is clear from these aberration graphs that various aberrations have been successfully corrected from a wide-angle end state to a telephoto end state in this zoom optical system ZL2.

Example 3

Figure 9:
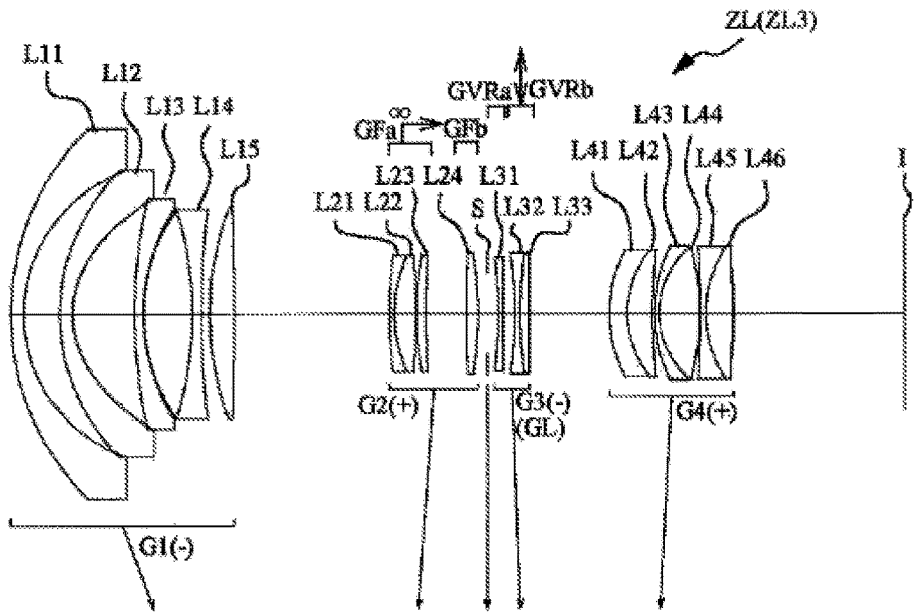
FIG. 9 is a cross-sectional diagram illustrating a lens configuration of a zoom optical system according to Example 3, where (W) denotes a wide-angle end state, (M) denotes an intermediate focal length state and (T) denotes a telephoto end state.
Figure 9:
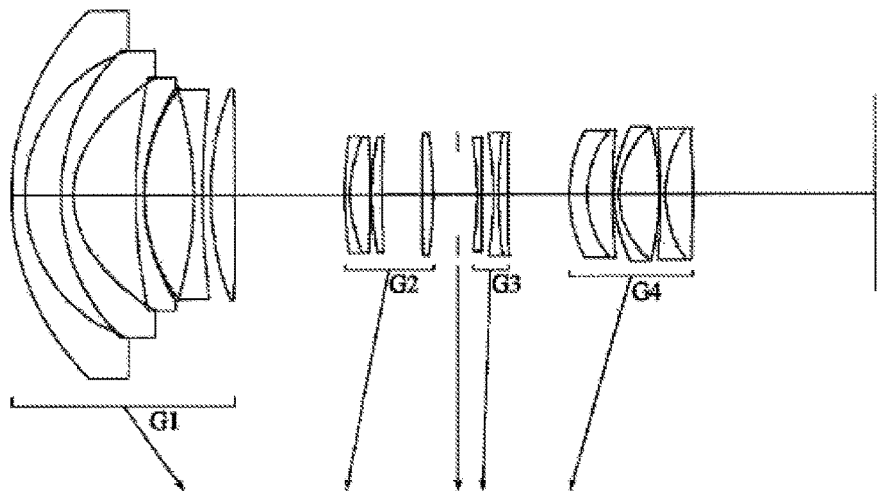
Figure 9:
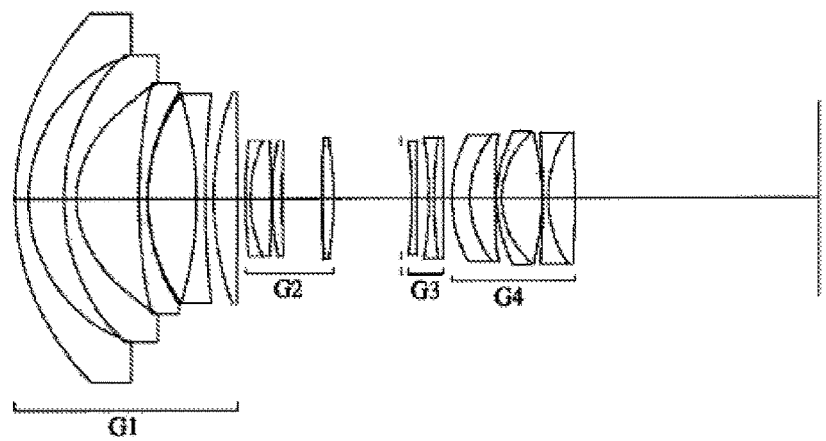

FIG. 9 is a diagram illustrating a configuration of a zoom optical system ZL3 according to Example 3. This zoom optical system ZL3 is constructed of a first lens group G1 having negative refractive power, a second lens group G2 having positive refractive power, a third lens group G3 which is a succeeding lens group GL having negative refractive power and a fourth lens group G4 having positive refractive power, which are disposed in order from an object.

In this zoom optical system ZL3, the first lens group G1 is constructed of a negative meniscus lens L11 having a convex surface facing the object, a negative meniscus lens L12 with a lens surface on the image side formed into an aspherical shape and having a convex surface facing the object, a negative meniscus lens L13 with a resin layer provided on a lens surface on the image side to form an aspherical surface and having a convex surface facing the object, a biconcave negative lens L14 and a biconvex positive lens L15, which are disposed in order from the object. The second lens group G2 is constructed of a cemented positive lens resulting from cementing a negative meniscus lens L21 having a convex surface facing the object and a biconvex positive lens L22, a positive meniscus lens L23 having a convex surface facing the object and a biconvex positive lens L24, which are disposed in order from the object. The third lens group G3 is constructed of a negative meniscus lens L31 having a concave surface facing the object and a cemented negative lens resulting from cementing a biconcave negative lens L32 and a positive meniscus lens L33 having a convex surface facing the object, which are disposed in order from the object. The fourth lens group G4 is constructed of a cemented positive lens resulting from cementing a negative meniscus lens L41 having a convex surface facing the object and a positive meniscus lens L42 having a convex surface facing the object, a cemented positive lens resulting from cementing a negative meniscus lens L43 having a convex surface facing the object and a biconvex positive lens L44, a biconcave negative lens L45 and a biconvex positive lens L46 with a lens surface on the image side formed into an aspherical shape, which are disposed in order from the object. An aperture stop S is disposed between the second lens group G2 and the third lens group G3. In Example 3, three lens components, that is, positive, positive and positive lens components are disposed between the first lens group G1 and the succeeding lens group GL.

The zoom optical system ZL3 is configured such that upon zooming from a wide-angle end state to a telephoto end state, the first lens group G1, the second lens group G2, the aperture stop S, the third lens group G3 and the fourth lens group G4 move along the optical axis, and upon zooming, a distance between the first lens group G1 and the second lens group G2 decreases, a distance between the second lens group G2 and the aperture stop S increases, a distance between the aperture stop S and the third lens group G3 changes, a distance between the third lens group G3 and the fourth lens group G4 decreases and a distance between the fourth lens group G4 and an image surface I (back focus, which will be described later) increases.

In this zoom optical system ZL3, the lenses located between the first lens group G1 and the third lens group G3 which is the succeeding lens group GL are the lenses of the second lens group G2. This second lens group G2 includes, in order from the object, a cemented positive lens resulting from cementing a negative meniscus lens L21 and a biconvex positive lens L22, a front group GFa having positive refractive power made up of a positive meniscus lens L23 and a rear group GFb having positive refractive power made up of a biconvex positive lens L24, and focusing from an infinite distant object point to a short distant object point is performed by moving the front group GFa of the second lens group G2 toward the image as a focusing group.

In the zoom optical system ZL3, the image position when image shake occurs is corrected (vibration isolation) by using, as a vibration-isolating group GVRb, a cemented negative lens resulting from cementing the biconcave negative lens L32 and the positive meniscus lens L33 in the third lens group G3 which is the succeeding lens group GL and moving the vibration-isolating group GVRb so as to have a displacement component in a direction orthogonal to the optical axis. This vibration-isolating group GVRb has negative refractive power. In a wide-angle end state in Example 3, since the vibration proof coefficient is −0.29 and the focal length is 14.40 [mm], an amount of movement of the vibration-isolating group GVRb to correct rotation blur of 0.50° is −0.43 [mm]. In the intermediate focal length state of Example 3, since the vibration proof coefficient is −0.30 and the focal length is 17.00 [mm], the amount of movement of the vibration-isolating group GVRb to correct rotation blur of 0.50° is −0.49 [mm]. In the telephoto end state of Example 3, since the vibration proof coefficient is −0.39 and the focal length is 27.40 [mm], the amount of movement of the vibration-isolating group GVRb to correct rotation blur of 0.50° is −0.62 [mm]. The negative meniscus lens L31 having negative refractive power corresponds to the object-side group GVRa.

Table 9 below shows data values of the zoom optical system ZL3.

TABLE 9

Example 3

[Overall data]

| | Wide-angle end state | | Intermediate focal length state | | Telephoto end state |
|---|---|---|---|---|---|
| f = | 14.40 | ~ | 17.00 | ~ | 27.40 |
| FNo = | 2.90 | ~ | 2.91 | ~ | 2.91 |

TABLE 9-continued

| Example 3 | | | | | |
|---|---|---|---|---|---|
| ω[°] = | 57.5 | ~ | 51.9 | ~ | 37.5 |
| Y = | 21.60 | ~ | 21.60 | ~ | 21.60 |
| TL = | 200.708 | ~ | 193.728 | ~ | 180.303 |
| BF = | 38.131 | ~ | 40.536 | ~ | 54.226 |
| BF (Air equivalent length) = | 38.131 | ~ | 40.536 | ~ | 54.226 |

[Lens data]

| m | r | d | nd | νd | |
|---|---|---|---|---|---|
| Object surface | ∞ | | | | |
| 1 | 57.00000 | 3.000 | 1.80400 | 46.6 | |
| 2 | 33.50000 | 8.000 | | | |
| 3 | 44.32444 | 2.800 | 1.74389 | 49.5 | |
| 4* | 20.56616 | 14.000 | | | |
| 5 | 116.70614 | 1.900 | 1.74100 | 52.7 | |
| 6 | 42.67501 | 0.200 | 1.56093 | 36.6 | |
| 7* | 44.45109 | 10.915 | | | |
| 8 | −78.51969 | 2.000 | 1.59319 | 67.9 | |
| 9 | 192.14467 | 1.855 | | | |
| 10 | 66.46240 | 5.433 | 1.90265 | 35.7 | |
| 11 | −1079.18540 | D11 | | | |
| 12 | 98.22853 | 1.150 | 1.81600 | 46.6 | |
| 13 | 30.82561 | 4.765 | 1.48749 | 70.4 | |
| 14 | −209.88034 | 0.200 | | | |
| 15 | 65.38068 | 2.237 | 1.77250 | 49.6 | |
| 16 | 219.70389 | 9.164 | | | |
| 17 | 432.66920 | 2.537 | 1.59349 | 67.0 | |
| 18 | −77.14457 | D18 | | | |
| 19 | 0.00000 | D19 | | | Aperture stop S |
| 20 | −92.08988 | 1.150 | 1.59349 | 67.0 | |
| 21 | −1802.18800 | 2.500 | | | |
| 22 | −92.45942 | 1.150 | 1.69680 | 55.5 | |
| 23 | 89.65294 | 2.196 | 1.90200 | 25.3 | |
| 24 | 1874.55510 | D24 | | | |
| 25 | 30.00000 | 4.000 | 1.74100 | 52.7 | |
| 26 | 22.20799 | 5.690 | 1.49782 | 82.5 | |
| 27 | 150.16612 | 0.400 | | | |
| 28 | 31.66090 | 1.150 | 1.81600 | 46.6 | |
| 29 | 19.23435 | 8.997 | 1.55332 | 71.7 | |
| 30 | −57.96347 | 0.200 | | | |
| 31 | −193.93343 | 1.150 | 1.90265 | 35.7 | |
| 32 | 26.06045 | 6.185 | 1.59319 | 67.9 | |
| 33* | −93.12648 | BF | | | |
| Image surface | ∞ | | | | |

[Lens group focal length]

| Lens group | Starting surface | Focal length |
|---|---|---|
| First lens group | 1 | −28.81 |
| Second lens group | 12 | 60.48 |
| Third lens group | 20 | −83.71 |
| Fourth lens group | 25 | 46.09 |

In the zoom optical system ZL3, the 4th, 7th and 33rd surfaces are formed into aspherical shapes. Table 10 below shows aspherical surface data, that is, conical coefficient K and values of the respective aspherical surface constants A4 to A10.

TABLE 10

[Aspherical surface data]

| m | K | A4 | A6 | A8 | A10 |
|---|---|---|---|---|---|
| 4 | 4.73000e−02 | 2.13716e−06 | 1.80496e−09 | 2.35690e−12 | 0.00000e+00 |
| 7 | −5.14900e−01 | 6.13782e−06 | −1.61401e−09 | 0.00000e+00 | 0.00000e+00 |
| 33 | −3.00000e+00 | 1.14512e−05 | 1.10533e−08 | 0.00000e+00 | 0.00000e+00 |

In this zoom optical system ZL3, an axial air distance D11 between the first lens group G1 and the second lens group G2, an axial air distance D18 between the second lens group G2 and the aperture stop S, an axial air distance D19 between the aperture stop S and the third lens group G3, an axial air distance D24 between the third lens group G3 and the fourth lens group G4 and the back focus BF vary upon zooming as described above. Table 11 below shows variable distances in respective focal length states: wide-angle end state (W) in an infinity focusing state, intermediate focal length state (M) and telephoto end state (T).

TABLE 11

[Variable distance data]

|     | W | M | T |
| --- | --- | --- | --- |
| D0  | ∞ | ∞ | ∞ |
| f   | 14.40 | 17.00 | 27.40 |
| D11 | 35.243 | 24.867 | 1.700 |
| D18 | 2.000 | 5.397 | 15.138 |
| D19 | 2.445 | 4.222 | 2.415 |
| D24 | 17.965 | 13.782 | 1.900 |
| BF  | 38.131 | 40.536 | 54.226 |

Table 12 below shows respective conditional expression corresponding values of the zoom optical system ZL3.

TABLE 12 f1VRaw=137.512
[Conditional expression corresponding value]
(1) |f1VRaw/fw|=9.549
(2) βaw=3.972
(3) (−f1)/f2=0.476

Thus, the zoom optical system ZL3 satisfies all the above conditional expressions (1) to (3).

Figure 10A:
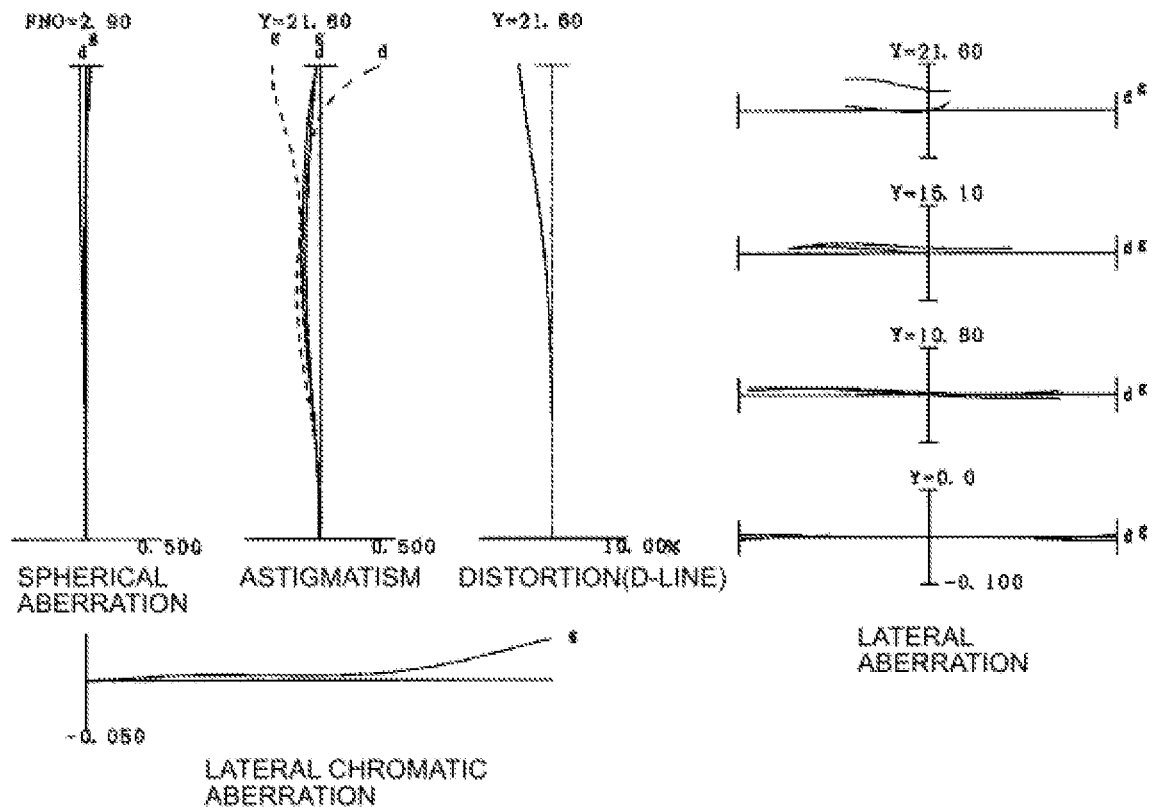
FIGS. 10A and 10B illustrate various aberration graphs of the zoom optical system according to Example 3 in a wide-angle end state, FIG. 10A illustrating various aberration graphs in an infinity focusing state and FIG. 10B illustrating a lateral aberration graph in an infinity focusing state when image shake is corrected.
Figure 10B:
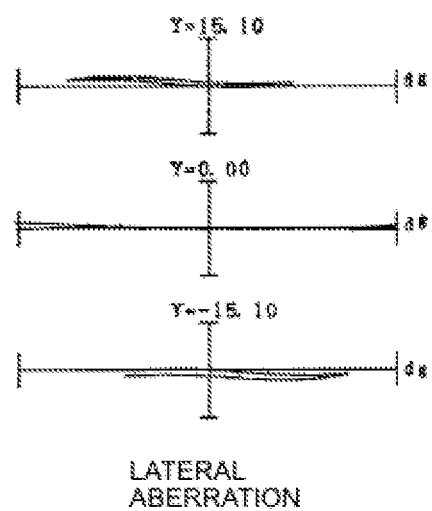
Figure 11A:
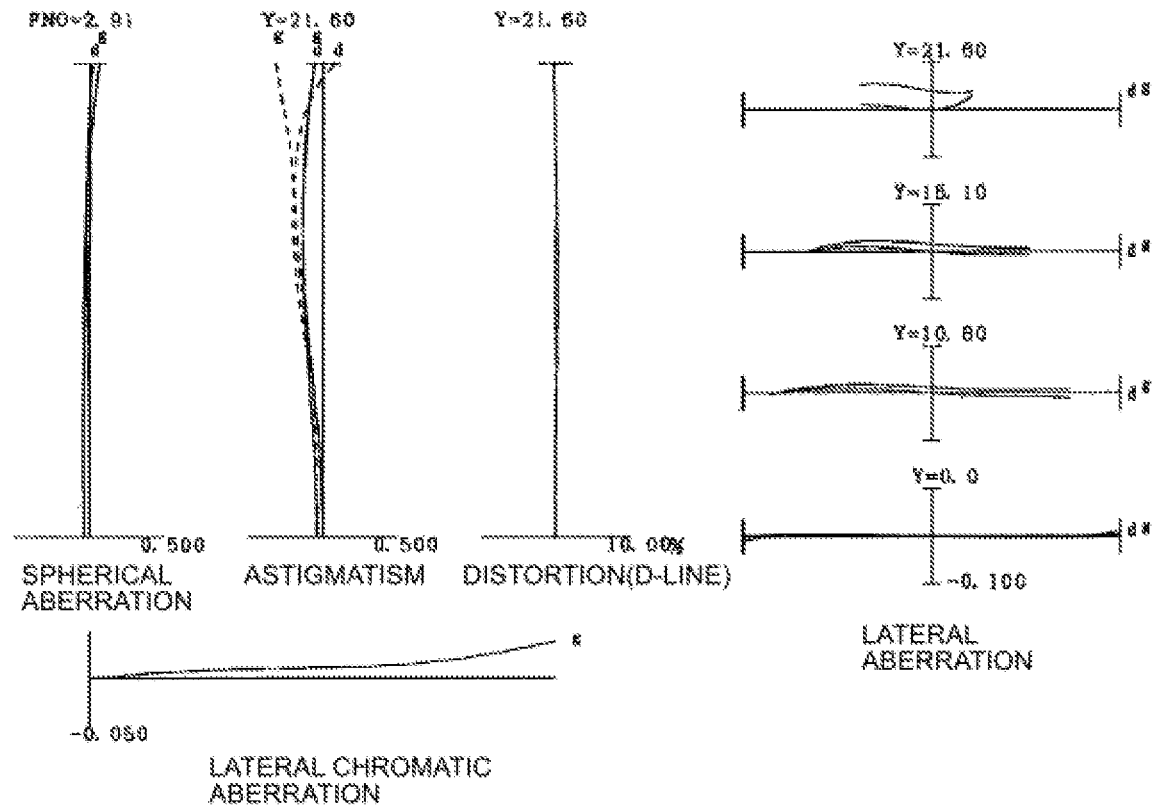
FIGS. 11A and 11B illustrate various aberration graphs of the zoom optical system according to Example 3 in an intermediate focal length state, FIG. 11A illustrating various aberration graphs in an infinity focusing state and FIG. 11B illustrating a lateral aberration graph in an infinity focusing state when image shake is corrected.
Figure 11B:
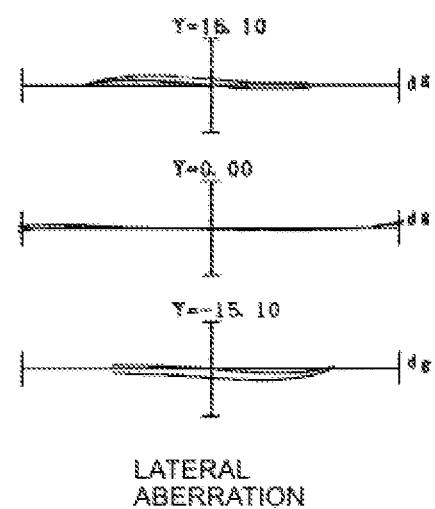
Figure 12A:
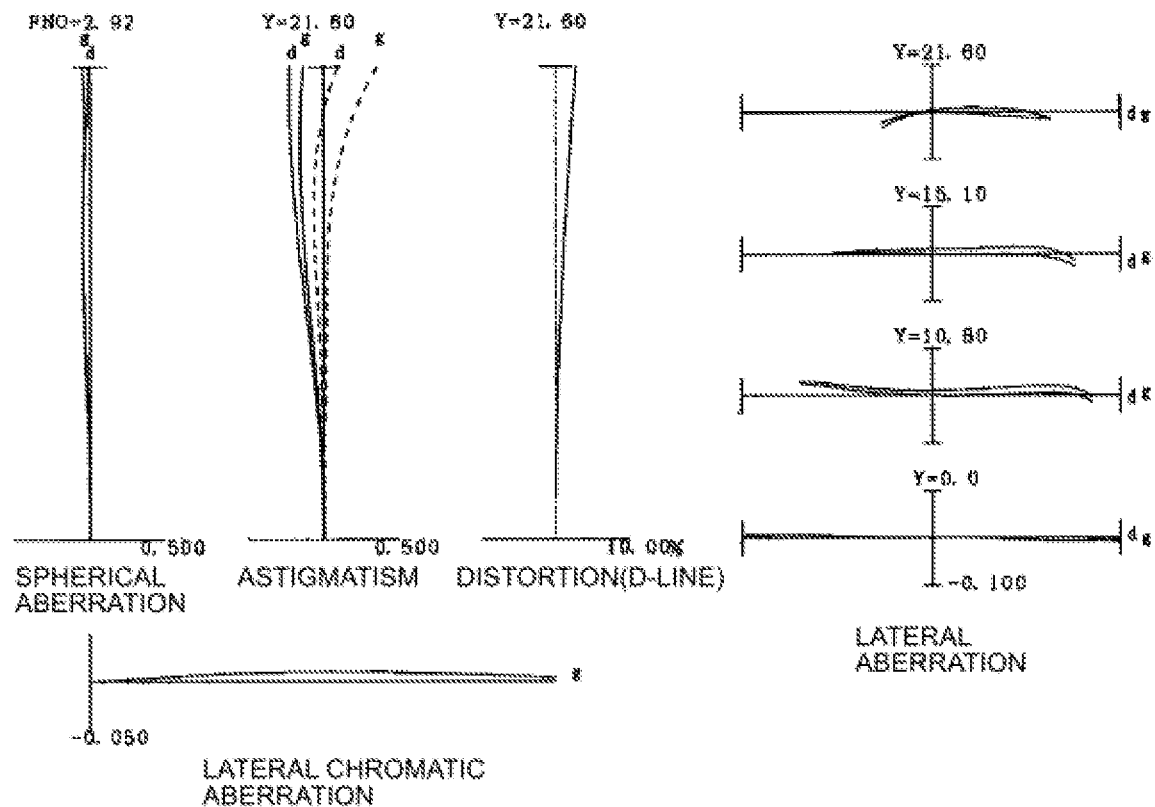
FIGS. 12A and 12B illustrate various aberration graphs of the zoom optical system according to Example 3 in a telephoto end state, FIG. 12A illustrating various aberration graphs in an infinity focusing state and FIG. 12B illustrating a lateral aberration graph in an infinity focusing state when image shake is corrected.
Figure 12B:
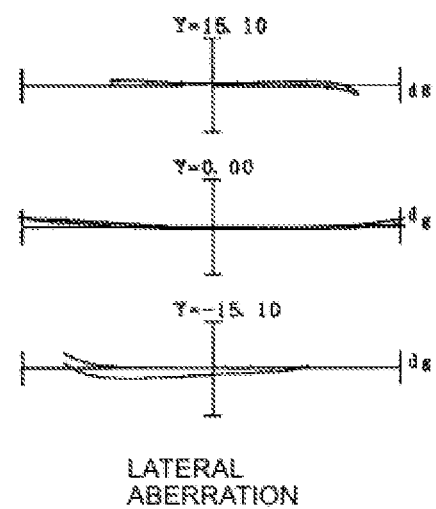

A spherical aberration graph, an astigmatism graph, a distortion graph, a lateral chromatic aberration graph and a lateral aberration graph in a wide-angle end state upon focusing on infinity, an intermediate focal length state and a telephoto end state of the zoom optical system ZL3 are shown in FIG. 10A, FIG. 11A and FIG. 12A, and lateral aberration graphs when image shake is corrected in the wide-angle end state upon focusing on infinity, the intermediate focal length state and the telephoto end state are shown in FIG. 10B, FIG. 11B and FIG. 12B. It is clear from these aberration graphs that various aberrations have been successfully corrected from a wide-angle end state to a telephoto end state in this zoom optical system ZL3.

Example 4

Figure 13:
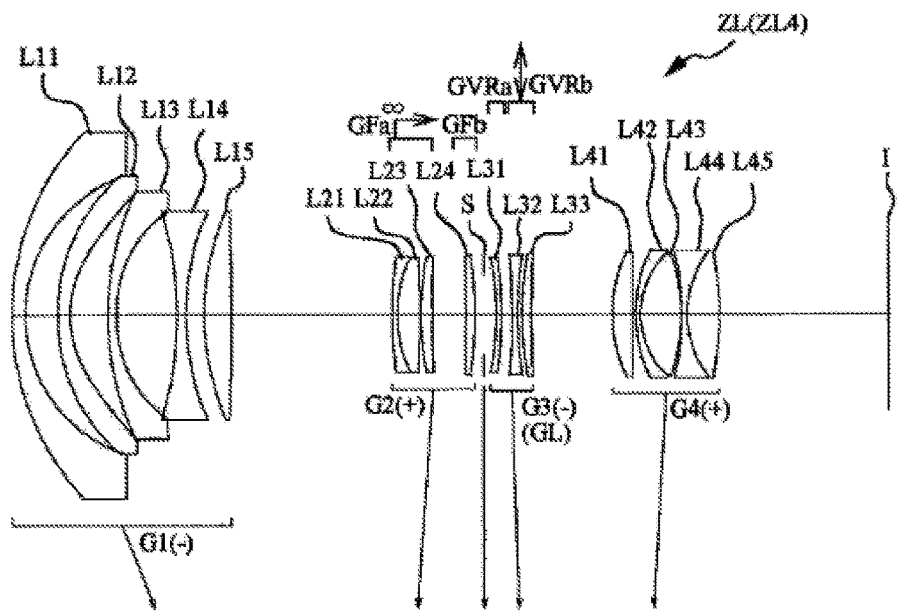
FIG. 13 is a cross-sectional diagram illustrating a lens configuration of a zoom optical system according to Example 4, where (W) denotes a wide-angle end state, (M) denotes an intermediate focal length state and (T) denotes a telephoto end state.
Figure 13:
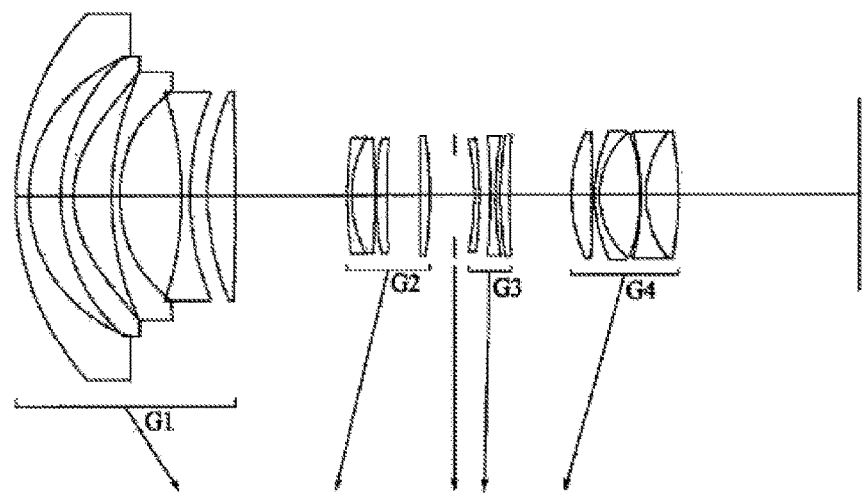
Figure 13:
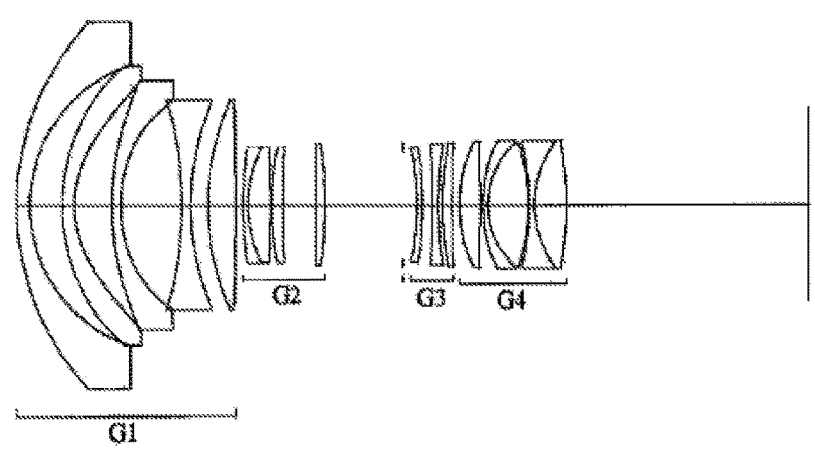

FIG. 13 is a diagram illustrating a configuration of a zoom optical system ZL4 according to Example 4. This zoom optical system ZL4 is constructed of a first lens group G1 having negative refractive power, a second lens group G2 having positive refractive power, a third lens group G3 which is a succeeding lens group GL having negative refractive power and a fourth lens group G4 having positive refractive power, which are disposed in order from an object.

In this zoom optical system ZL4, the first lens group G1 is constructed of a negative meniscus lens L11 having a convex surface facing the object, a negative meniscus lens L12, a lens surface on the image side of which is formed into an aspherical shape, a negative meniscus lens L13 with a lens surface on the image side formed into an aspherical shape, a biconcave negative lens L14 and a biconvex positive lens L15, which are disposed in order from the object. The second lens group G2 is constructed of a cemented positive lens resulting from cementing a negative meniscus lens L21 having a convex surface facing the object and a biconvex positive lens L22, a positive meniscus lens L23 having a convex surface facing the object and a negative meniscus lens L24 having a convex surface facing the object, which are disposed in order from the object. The third lens group G3 is constructed of a negative meniscus lens L31 having a concave surface facing the object, a biconcave negative lens L32 and a positive meniscus lens L33 having a convex surface facing the object, which are disposed in order from the object. The fourth lens group G4 is constructed of a biconvex positive lens L41 with a lens surface on the object side formed into an aspherical shape, a cemented positive lens resulting from cementing a negative meniscus lens L42 having a convex surface facing the object and a biconvex positive lens L43, a biconcave negative lens L44 and a biconvex positive lens L45 with a lens surface on the image side formed into an aspherical shape, which are disposed in order from the object. An aperture stop S is disposed between the second lens group G2 and the third lens group G3. In Example 4, three lens components, that is, positive, positive and negative lens components are disposed between the first lens group G1 and the succeeding lens group GL.

The zoom optical system ZL4 is configured such that upon zooming from a wide-angle end state to a telephoto end state, the first lens group G1, the second lens group G2, the aperture stop S, the third lens group G3 and the fourth lens group G4 move along the optical axis, so that a distance between the first lens group G1 and the second lens group G2 decreases, a distance between the second lens group G2 and the aperture stop S increases, a distance between the aperture stop S and the third lens group G3 changes, a distance between the third lens group G3 and the fourth lens group G4 decreases and a distance between the fourth lens group G4 and an image surface I (back focus, which will be described later) increases.

In this zoom optical system ZL4, the lenses located between the first lens group G1 and the third lens group G3 which is the succeeding lens group GL are the lenses of the second lens group G2. This second lens group G2 includes, in order from the object, a cemented positive lens resulting from cementing the negative meniscus lens L21 and the biconvex positive lens L22, a front group GFa having positive refractive power made up of the positive meniscus lens L23 and a rear group GFb having positive refractive power made up of the positive meniscus lens L24. Focusing from an infinite distant object point to a short distant object point is performed by moving the front group GFa of the second lens group G2 toward the image as a focusing group.

In the zoom optical system ZL4, the image position when image shake occurs is corrected (vibration isolation) by using, as a vibration-isolating group GVRb, the biconcave negative lens L32 and the positive meniscus lens L33 in the third lens group G3 which is the succeeding lens group GL and moving the vibration-isolating group GVRb so as to have a displacement component in a direction orthogonal to the optical axis. This vibration-isolating group GVRb has negative refractive power. In a wide-angle end state in Example 4, since the vibration proof coefficient is −0.32 and the focal length is 14.40 [mm], an amount of movement of the vibration-isolating group GVRb to correct rotation blur of 0.50° is −0.39 [mm]. In the intermediate focal length state of Example 4, since the vibration proof coefficient is −0.34 and the focal length is 17.01 [mm], the amount of movement of the vibration-isolating group GVRb to correct rotation blur of 0.50° is −0.44 [mm]. In the telephoto end state of Example 4, since the vibration proof coefficient is −0.43 and the focal length is 27.40 [mm], the amount of movement of the vibration-isolating group GVRb to correct rotation blur of 0.50° is −0.56 [mm]. The negative meniscus lens L31 having negative refractive power corresponds to the object-side group GVRa.

Table 13 below shows data values of the zoom optical system ZL4.

TABLE 13

Example 4

[Overall data]

|  | Wide-angle end state | | Intermediate focal length state | | Telephoto end state |
|---|---|---|---|---|---|
| f = | 14.40 | ~ | 17.01 | ~ | 27.40 |
| FNo = | 2.92 | ~ | 2.91 | ~ | 2.92 |
| ω[°] = | 57.5 | ~ | 51.9 | ~ | 37.5 |
| Y = | 21.60 | ~ | 21.60 | ~ | 21.60 |
| TL = | 198.804 | ~ | 191.240 | ~ | 179.307 |
| BF = | 38.139 | ~ | 40.784 | ~ | 54.434 |
| BF (Air equivalent length) = | 38.139 | ~ | 40.784 | ~ | 54.434 |

[Lens data]

| m | r | d | nd | vd | |
|---|---|---|---|---|---|
| Object surface | ∞ | | | | |
| 1 | 60.00000 | 3.000 | 1.80400 | 46.6 | |
| 2 | 33.00000 | 7.275 | | | |
| 3 | 41.80774 | 2.800 | 1.69350 | 53.2 | |
| 4* | 22.41099 | 8.629 | | | |
| 5 | 65.63490 | 1.900 | 1.74100 | 52.7 | |
| 6* | 33.83467 | 13.874 | | | |
| 7 | −79.77665 | 2.000 | 1.59319 | 67.9 | |
| 8 | 59.40503 | 4.000 | | | |
| 9 | 57.71052 | 6.283 | 1.88300 | 40.8 | |
| 10 | −624.68766 | D10 | | | |
| 11 | 88.00189 | 1.150 | 1.77250 | 49.6 | |
| 12 | 28.92756 | 5.218 | 1.48749 | 70.4 | |
| 13 | −237.39954 | 0.200 | | | |
| 14 | 62.41514 | 2.570 | 1.59349 | 67.0 | |
| 15 | 436.07106 | 7.583 | | | |
| 16 | −660.09319 | 2.088 | 1.77250 | 49.6 | |
| 17 | −89.22600 | D17 | | | |
| 18 | 0.00000 | D18 | | | Aperture stop S |
| 19 | −61.76466 | 1.150 | 1.67790 | 55.4 | |
| 20 | −91.96957 | 2.500 | | | |
| 21 | −127.44790 | 1.150 | 1.72916 | 54.7 | |
| 22 | 82.89939 | 1.024 | | | |
| 23 | 76.38005 | 2.134 | 1.84666 | 23.8 | |
| 24 | 284.40987 | D24 | | | |
| 25* | 32.48939 | 4.642 | 1.55332 | 71.7 | |
| 26 | −824.47129 | 0.600 | | | |
| 27 | 32.14197 | 1.150 | 1.81600 | 46.6 | |
| 28 | 18.55000 | 9.230 | 1.49700 | 81.6 | |
| 29 | −43.54574 | 0.200 | | | |
| 30 | −56.26075 | 1.150 | 1.88300 | 40.8 | |
| 31 | 23.24938 | 7.318 | 1.59319 | 67.9 | |
| 32* | −55.62584 | D32 | | | |
| Image surface | ∞ | | | | |

[Lens group focal length]

| Lens group | Starting surface | Focal length |
|---|---|---|
| First lens group | 1 | −28.80 |
| Second lens group | 11 | 62.81 |
| Third lens group | 19 | −100.62 |
| Fourth lens group | 25 | 48.29 |

In the zoom optical system ZL4, the 4th, 6th, 25th and 32nd surfaces are formed into aspherical shapes. Table 14 below shows aspherical surface data, that is, conical coefficient K and values of the respective aspherical surface constants A4 to A10.

TABLE 14

[Aspherical surface data]

| m | K | A4 | A6 | A8 | A10 |
|---|---|---|---|---|---|
| 4 | 1.24900e−01 | −3.97515e−06 | −3.16906e−09 | 1.82067e−12 | 0.00000e+00 |
| 6 | 1.15510e+00 | 5.92900e−06 | 1.43820e−09 | 0.00000e+00 | 0.00000e+00 |
| 25 | 4.93200e−01 | 2.95700e−06 | 0.00000e+00 | 0.00000e+00 | 0.00000e+00 |
| 32 | 7.81000e−01 | 1.02310e−05 | 8.43261e−09 | 0.00000e+00 | 0.00000e+00 |

In this zoom optical system ZL4, an axial air distance D10 between the first lens group G1 and the second lens group G2, an axial air distance D17 between the second lens group G2 and the aperture stop S, an axial air distance D18 between the aperture stop S and the third lens group G3, an axial air distance D24 between the third lens group G3 and the fourth lens group G4 and the back focus BF vary upon zooming as described above. Table 15 below shows variable distances in respective focal length states: wide-angle end state (W) in an infinity focusing state, intermediate focal length state (M) and telephoto end state (T).

TABLE 15

[Variable distance data]

| | W | M | T |
|---|---|---|---|
| D0 | ∞ | ∞ | ∞ |
| f | 14.40 | 17.01 | 27.40 |
| D10 | 36.783 | 25.663 | 1.700 |
| D17 | 2.000 | 5.556 | 17.491 |
| D18 | 2.687 | 4.408 | 3.164 |
| D24 | 18.377 | 14.010 | 1.700 |
| BF | 38.139 | 40.784 | 54.434 |

Table 16 below shows respective conditional expression corresponding values of the zoom optical system ZL4.

TABLE 16 f1VRaw=70.544
[Conditional expression corresponding value]
(1) |f1VRaw/fw|=4.899
(2) βaw=1.907
(3) (−f1)/f2=0.459

Thus, the zoom optical system ZL4 satisfies all the above conditional expressions (1) to (3).

Figure 14A:
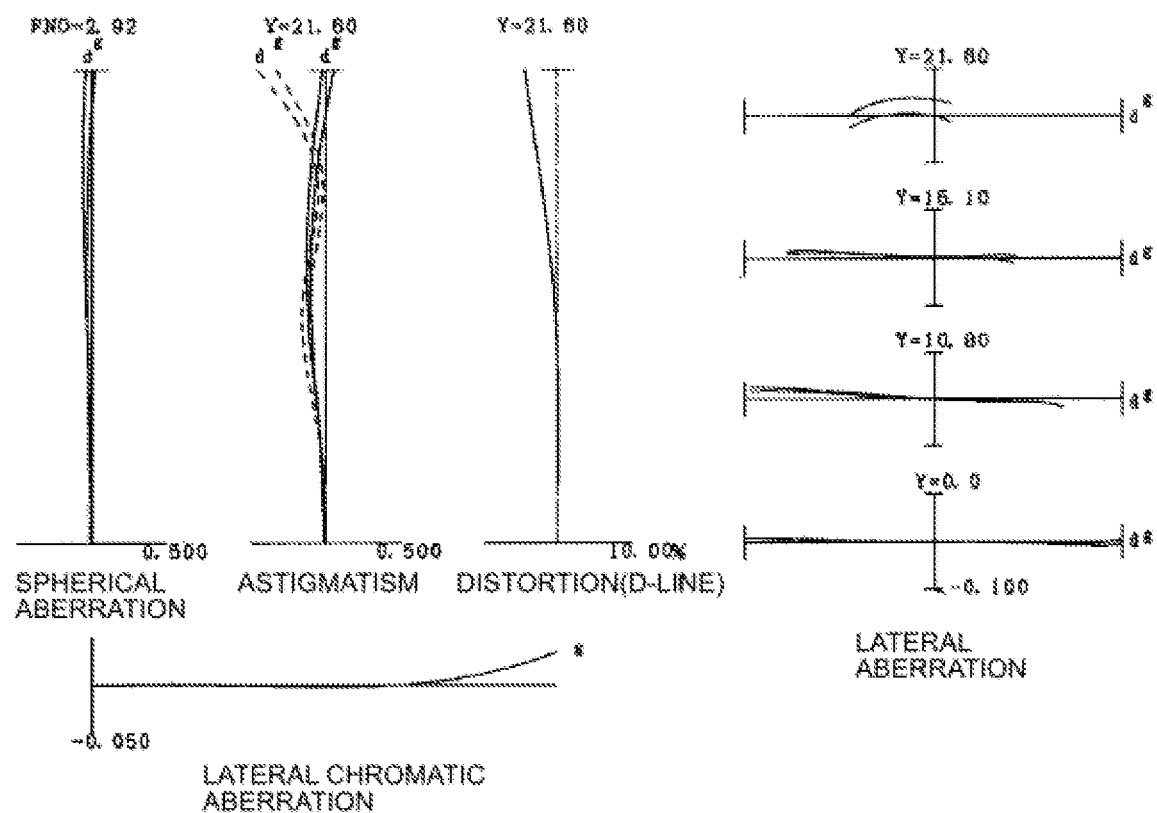
FIGS. 14A and 14B illustrate various aberration graphs of the zoom optical system according to Example 4 in a wide-angle end state, FIG. 14A illustrating various aberration graphs in an infinity focusing state and FIG. 14B illustrating a lateral aberration graph in an infinity focusing state when image shake is corrected.
Figure 14B:
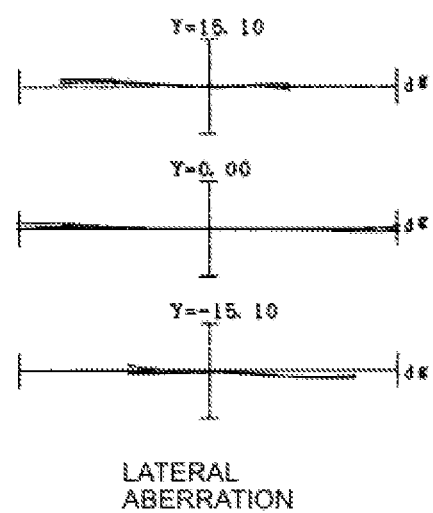
Figure 15A:
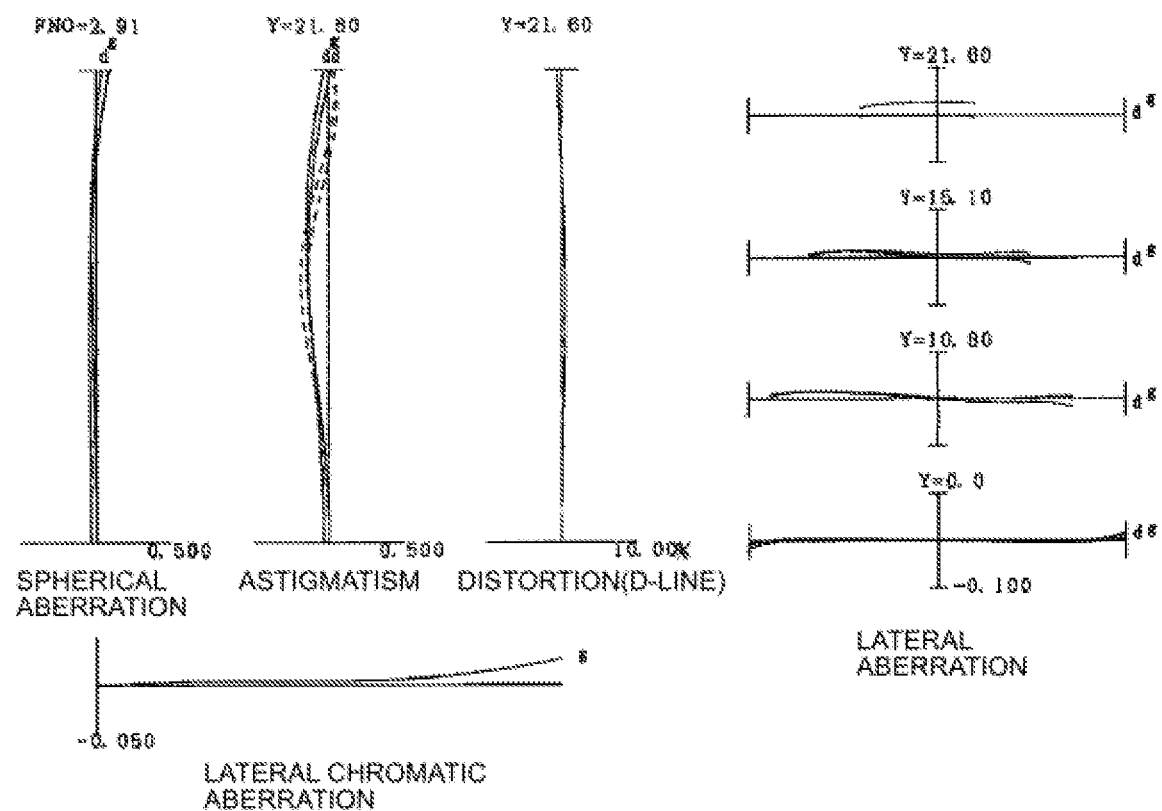
FIGS. 15A and 15B illustrate various aberration graphs of the zoom optical system according to Example 4 in an intermediate focal length state, FIG. 15A illustrating various aberration graphs in an infinity focusing state and FIG. 15B illustrating a lateral aberration graph in an infinity focusing state when image shake is corrected.
Figure 15B:
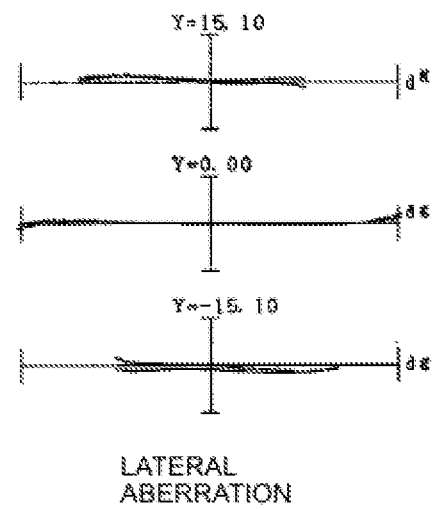
Figure 16A:
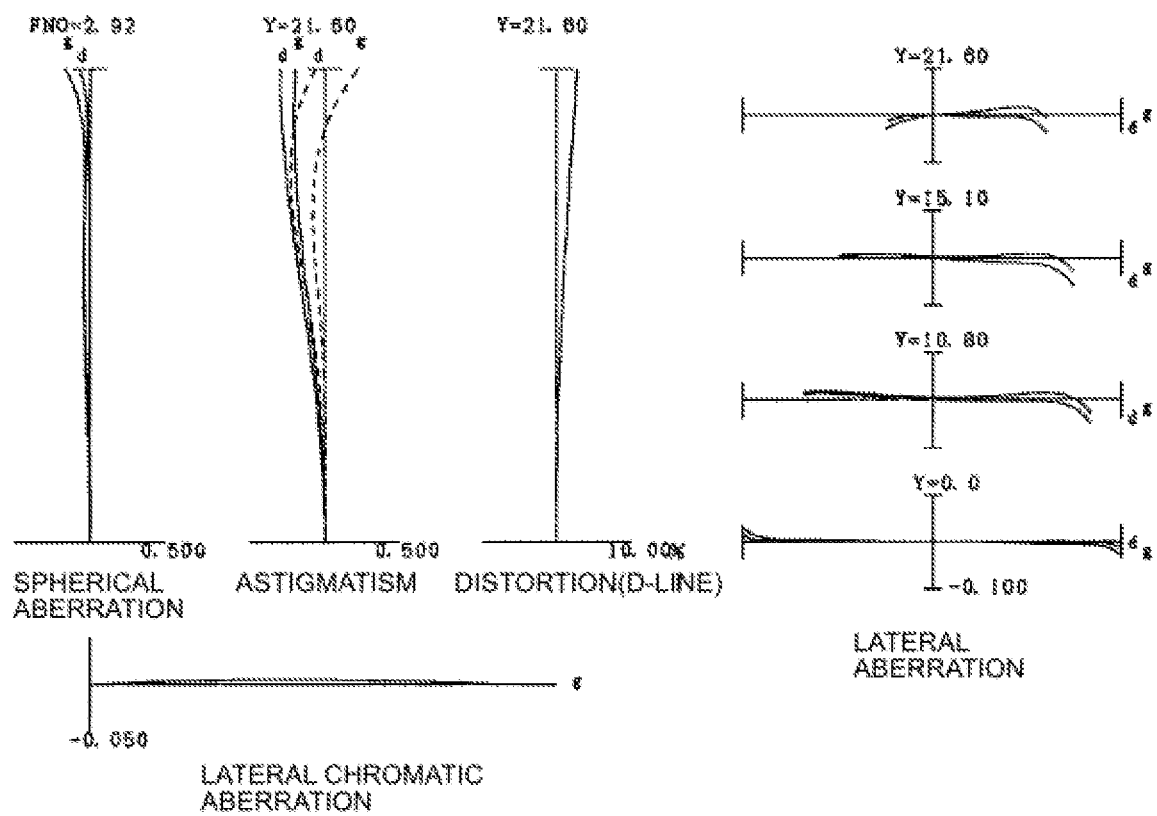
FIGS. 16A and 16B illustrate various aberration graphs of the zoom optical system according to Example 4 in a telephoto end state, FIG. 16A illustrating various aberration graphs in an infinity focusing state and FIG. 16B illustrating a lateral aberration graph in an infinity focusing state when image shake is corrected.
Figure 16B:
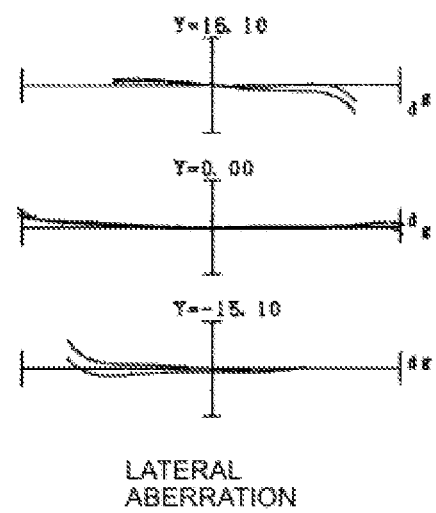

A spherical aberration graph, an astigmatism graph, a distortion graph, a lateral chromatic aberration graph and a lateral aberration graph in a wide-angle end state upon focusing on infinity, an intermediate focal length state and a telephoto end state of the zoom optical system ZL4 are shown in FIG. 14A, FIG. 15A and FIG. 16A, and lateral aberration graphs when image shake is corrected in the wide-angle end state upon focusing on infinity, the intermediate focal length state and the telephoto end state are shown in FIG. 14B, FIG. 15B and FIG. 16B. It is clear from these aberration graphs that various aberrations have been successfully corrected from a wide-angle end state to a telephoto end state in this zoom optical system ZL4.

EXPLANATION OF NUMERALS AND CHARACTERS

ZL (ZL1 to ZL4) Zoom optical system
G1 First lens group
G2 Second lens group
GL Succeeding lens group
GVRa Object-side group
GVRb Vibration-isolating group
GF Focusing group
1 Camera (optical apparatus)

The invention claimed is:

1. A zoom optical system comprising:
a first lens group having negative refractive power;
a second lens group having positive refractive power, the second lens group being disposed further toward an image than the first lens group; and
a succeeding lens group having a vibration-isolating group that moves so as to have a displacement component in a direction orthogonal to an optical axis, the succeeding lens group being disposed further toward the image than the second lens group, wherein
the first lens group comprising, in order from an object, a negative lens, a negative lens and a negative lens,
a distance between the first lens group and the second lens group changes and a distance between the second lens group and the succeeding lens group changes upon zooming, and
the following conditional expression is satisfied:

$$4.899 \le |f1VRaw/fw| < 1000.000$$

where,
f1VRaw: a composite focal length in a wide-angle end state of a lens disposed further toward the object than the vibration-isolating group, and
fw: a focal length of the whole system in the wide-angle end state.

2. The zoom optical system according to claim 1, wherein the vibration-isolating group comprises at least one positive lens and at least one negative lens.

3. The zoom optical system according to claim 1, wherein there are four or more lenses disposed further toward the image than the first lens group and further toward the object than the succeeding lens group.

4. The zoom optical system according to claim 1, wherein the succeeding lens group comprises the vibration-isolating group and an object-side group disposed on an object side of the vibration-isolating group and having negative refractive power, and the following conditional expression is satisfied:

$$-30.00 < \beta aw < 10.00$$

where,
βaw: image forming magnification of the object-side group in a wide-angle end state.

5. The zoom optical system according to claim 1, wherein
at least part of a lens group located between the first lens group and the succeeding lens group is used as a focusing group, and
upon focusing, the focusing group is moved in the optical axis direction.

6. The zoom optical system according to claim 5, wherein the focusing group has positive refractive power.

7. The zoom optical system according to claim 1, wherein the following conditional expression is satisfied:

$$0.200 < (-f1)/f2 < 0.700$$

where,
f1: a focal length of the first lens group, and
f2: a focal length of the second lens group.

8. An optical apparatus comprising the zoom optical system according to claim 1.

9. A zoom optical system comprising:
a first lens group having negative refractive power;
a second lens group having positive refractive power, the second lens group being disposed further toward an image than the first lens group; and
a succeeding lens group having a vibration-isolating group that moves so as to have a displacement component in a direction orthogonal to an optical axis, the succeeding lens group being disposed further toward the image than the second lens group, wherein
the first lens group comprising, in order from an object, a negative lens, a negative lens and a negative lens,
the second lens group including at least two lens components, the lens component being either a single lens or a cemented lens,
a distance between the first lens group and the second lens group changes and a distance between the second lens group and the succeeding lens group changes upon zooming, and
the following conditional expression is satisfied:

$$0.200 < (-f1)/f2 < 0.500$$

where,
f1: a focal length of the first lens group, and
f2: a focal length of the second lens group.

10. The zoom optical system according to claim 9, wherein the vibration-isolating group comprises at least one positive lens and at least one negative lens.

11. The zoom optical system according to claim 9, wherein there are four or more lenses disposed further toward the image than the first lens group and further toward the object than the succeeding lens group.

12. The zoom optical system according to claim 9, wherein
at least part of a lens group located between the first lens group and the succeeding lens group is used as a focusing group, and
upon focusing, the focusing group is moved in the optical axis direction.

13. The zoom optical system according to claim 12, wherein the focusing group has positive refractive power.

14. An optical apparatus comprising the zoom optical system according to claim 9.

15. A method for manufacturing a zoom optical system comprising:
a first lens group having negative refractive power;
a second lens group having positive refractive power, the second lens group being disposed further toward an image than the first lens group; and
a succeeding lens group comprising a vibration-isolating group that moves so as to have a displacement component in a direction orthogonal to an optical axis, the succeeding lens group being disposed further toward the image than the second lens group, wherein
the first lens group comprising, in order from an object, a negative lens, a negative lens and a negative lens,
the second lens group including at least two lens components, the lens component being either a single lens or a cemented lens, and
the lens groups are disposed such that a distance between the first lens group and the second lens group changes and a distance between the second lens group and the succeeding lens group changes upon zooming, and
either one of the following conditional expressions is satisfied:

$$4.899 \le |f1VRaw/fw| < 1000.000 \text{ or}$$

$$0.200 < (-f1)/f2 < 0.500$$

where,
f1VRaw: a composite focal length in a wide-angle end state of a lens disposed further toward the object than the vibration-isolating group,
fw: a focal length of the whole system in the wide-angle end state,
f1: a focal length of the first lens group, and
f2: a focal length of the second lens group.

* * * * *